US012679046B2

(12) United States Patent     (10) Patent No.: US 12,679,046 B2

Lenser et al.     (45) Date of Patent: Jul. 14, 2026

---

(54) METHOD FOR FORMING PROTRUSIONS IN A SUBSTRATE USED TO MANUFACTURE ABSORBENT ARTICLES

(71) Applicant: The Procter & Gamble Company, Cincinnati, OH (US)

(72) Inventors: Todd Douglas Lenser, Liberty Township, OH (US); Randall Allen Myers, Fairfield, OH (US); Russell Andrew Hayden, New Richmond, OH (US); Keith Richard Willhaus, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 369 days.

(21) Appl. No.: 18/495,137

(22) Filed: Oct. 26, 2023

(65) Prior Publication Data

US 2024/0140048 A1    May 2, 2024

Related U.S. Application Data

(60) Provisional application No. 63/381,607, filed on Oct. 31, 2022.

(51) Int. Cl.
   *B29C 67/00*      (2017.01)
   *B29L 31/48*      (2006.01)
   (Continued)

(52) U.S. Cl.
   CPC ........ *B29C 67/0048* (2013.01); *B29C 59/046* (2013.01); *B29L 2031/4878* (2013.01); *B29L 2031/729* (2013.01)

(58) Field of Classification Search
   CPC ................................................ B29L 2031/729
   See application file for complete search history.

(56) References Cited

U.S. PATENT DOCUMENTS 4,794,028 A * 12/1988 Fischer ................. B29C 43/222
                                                                         24/442
6,517,671 B2    2/2003 Couillard
(Continued)

FOREIGN PATENT DOCUMENTS

DE    202011002504 U1    4/2011
WO      2018006946 A1    1/2018
WO      2019018721 A1    1/2019

OTHER PUBLICATIONS

EPO Search Report and Opinion for 23206588.8 dated Mar. 11, 2024, 7 pages.

(Continued)

*Primary Examiner* — Benjamin A Schiffman
(74) *Attorney, Agent, or Firm* — Gregory P. Habiak; Christian M. Best

(57) ABSTRACT

A method is presented for altering a portion of a substrate. The method includes providing a first device including an outer surface and a second device including a source of vibration energy. The method also includes forming a nip between the source of vibration energy and the outer surface. The method also includes conveying the substrate through the nip and intermittently altering the portion of the substrate in the nip to create a pattern of altered areas forming a shape. The altered areas have a pattern balance that includes one or more of: an average area of the substrate altered in the nip is within a threshold range across the portion of the substrate; and a simple area of integral areas within the altered areas is within a threshold range across the portion of the substrate.

20 Claims, 9 Drawing Sheets

(51) Int. Cl.
      *B29C 59/04*          (2006.01)
      *B29L 31/00*          (2006.01)

(56)              References Cited

U.S. PATENT DOCUMENTS

| | | | |
|---|---|---|---|
| 6,764,563 B2 | 7/2004 | Henry | |
| 8,244,393 B2 | 8/2012 | McLaughlin | |
| 8,745,827 B2 | 6/2014 | Rocha | |
| 8,784,722 B2 | 7/2014 | Rocha | |
| 8,784,772 B2 | 7/2014 | Berman | |
| 9,068,912 B2 | 6/2015 | Kline | |
| 9,265,673 B2 | 2/2016 | Stabelfeldt et al. | |
| 9,265,674 B2 | 2/2016 | Hancock-cooke et al. | |
| 9,282,790 B2 | 3/2016 | Rocha et al. | |
| 9,333,125 B2 | 5/2016 | Kline et al. | |
| 9,763,836 B2 | 9/2017 | Kawka | |
| 9,795,194 B2 | 10/2017 | Rocha | |
| 10,076,162 B2 | 9/2018 | Rocha | |
| 10,159,313 B2 | 12/2018 | Rocha et al. | |
| 10,405,614 B2 | 9/2019 | Rocha | |
| 10,798,997 B2 | 10/2020 | Rocha | |
| 10,953,592 B2 | 3/2021 | Rocha | |
| 10,981,321 B2 | 4/2021 | Rocha | |
| 11,058,186 B2 | 7/2021 | Rocha | |
| 2005/0125180 A1 | 6/2005 | Miller | |
| 2010/0180407 A1 | 7/2010 | Rocha | |
| 2012/0150331 A1 | 6/2012 | Debruler | |
| 2014/0200543 A1 | 7/2014 | Chatterjee | |
| 2019/0060135 A1 | 2/2019 | Kawka | |
| 2019/0224054 A1 | 7/2019 | Silfverstrand et al. | |
| 2019/0387846 A1 | 12/2019 | Rocha | |
| 2020/0060898 A1 | 2/2020 | Surushe et al. | |
| 2020/0179184 A1 | 6/2020 | Kaiser | |
| 2021/0145562 A1 | 5/2021 | Paul | |
| 2021/0251825 A1 | 8/2021 | Roe | |
| 2021/0386601 A1 | 12/2021 | Hayden et al. | |
| 2021/0386602 A1 | 12/2021 | Raycheck et al. | |
| 2022/0106713 A1 | 4/2022 | Schneider et al. | |
| 2023/0330621 A1 | 10/2023 | Lenser et al. | |
| 2023/0330630 A1 | 10/2023 | Lenser et al. | |
| 2023/0405943 A1 | 12/2023 | Lenser | |
| 2024/0060905 A1 | 2/2024 | Lenser et al. | |
| 2024/0216183 A1 * | 7/2024 | Lenser | B29C 66/83413 |
| 2025/0143416 A1 * | 5/2025 | Lenser | A44B 18/0069 |
| 2025/0344813 A1 * | 11/2025 | Lenser | B29C 43/222 |

OTHER PUBLICATIONS

Unpublished U.S. Appl. No. 18/539,402, filed Dec. 14, 2023, to Todd Douglas Lenser et al.

* cited by examiner

244

235

247a'

239

247b'

246

ALTERED
AREA
232'

CD AXIS
241

PERIMETER
250'

SHAPE
240

244

235

247a"

247b"

ISLAND
AREA
252

247c"

246

SHAPE
240'

ALTERED
AREA
232"

239'

247a""

247b""

235

ALTERED
AREA
232'''

PERIMETER
250'''

SHAPE
240"

247a""

247b""

235

ISLAND
AREA
252'

ALTERED
AREA
232""

METHOD FOR FORMING PROTRUSIONS IN A SUBSTRATE USED TO MANUFACTURE ABSORBENT ARTICLES

CROSS REFERENCE TO RELATED APPLICATION

This application claims the benefit of U.S. Provisional Application No. 63/381,607, filed on Oct. 31, 2022, the substance of which is incorporated herein by reference.

FIELD

The present disclosure relates generally to the field of unitary protrusion formation in substrates used to manufacture absorbent articles and more specifically to shaping altered areas of the substrate where unitary protrusions are formed.

BACKGROUND

Unitary protrusion formation is employed when forming substrates that are used in manufacturing absorbent articles (e.g. diapers). The unitary protrusions formed in the substrate are used for various components of the absorbent article (e.g. fastener).

Defects are common in conventional methods for unitary protrusion formation. For example, in these conventional methods a substrate is passed through a nip between a first device (e.g. anvil roll with multiple protrusion-shaped cavities) and a second device (e.g. source of vibrational energy) and is altered in the nip such that protrusions are formed in the substrate. An area of the substrate being altered in the nip varies as the substrate moves through the nip. For example, a first area of the substrate is altered in the nip at a first time period after which a second area of the substrate is altered in the nip at a second time period. When the change in the area being altered (e.g. between the first area and the second area) is large, this can lead to performance deficiencies in the system. For example, if the area of the substrate being altered in the nip changes more than a threshold amount, insufficient contact forces can result in the nip which hinders the flow of material to form the protrusions. In another example, one or more control loops of the system can be affected, resulting in undesired deviation of system frequency and amplitude.

The discussion of shortcomings and needs existing in the field prior to the present disclosure is in no way an admission that such shortcomings and needs were recognized by those skilled in the art prior to the present disclosure.

SUMMARY

Various embodiments solve the above-mentioned problems by providing methods and apparatuses useful for forming protrusions in a substrate used in the manufacturing of absorbent articles. These disclosed methods and apparatuses avoid excessive change in the area of the substrate being altered in the nip and thus overcome the performance deficiencies attributable to large variations in this area.

A first set of embodiments are disclosed for providing a method of altering a portion of a substrate. The method includes providing a first device including an outer surface. The method also includes providing a second device including a source of vibration energy. The method also includes forming a nip between the source of vibration energy and the outer surface. The method also includes conveying the substrate through the nip. The method also includes intermittently altering the portion of the substrate in the nip to create a pattern of altered areas forming a shape. The altered areas have a pattern balance that includes one or more of: an average area of the substrate altered in the nip is within a threshold range across the portion of the substrate; and a simple area of integral areas within the altered areas is within a threshold range across the portion of the substrate.

A second set of embodiments are disclosed that are similar to the first set of embodiments, except the altered areas have a pattern balance that further includes one or more of: a rate of change of an average area of the substrate altered in the nip is less than a threshold value across the portion of the substrate; and a rate of change of the simple area of integral areas within the altered area is within a threshold range across the portion of the substrate.

A third set of embodiments are disclosed that are similar to the first set of embodiments, except the altered areas have a pattern balance that is based on a width of integral areas within the altered area in a cross machine direction not exceeding a maximum width threshold value across the portion of the substrate.

A fourth set of embodiments are disclosed for providing a method of creating protrusions in a portion of a substrate. The method includes providing a first device comprising an outer surface. The method also includes providing a second device comprising a source of vibration energy. The method also includes forming a nip between the source of vibration energy and the outer surface. The method also includes conveying the substrate through the nip. The method also includes continuously creating the protrusions in the portion of the substrate in the nip to create a continuous area of the protrusions. The method also includes flattening a portion of the continuous area of the protrusions to create intermittent areas of the protrusions in the substrate intermediate flattened portions.

According to various embodiments, the method may also comprise cooling the source of vibrational energy or the first device.

According to various embodiments, the method may also comprise that the second device is a rotary sonotrode, and the vibration energy is ultrasonic energy.

According to various embodiments, the method may also comprise that the second device is a blade sonotrode, and the vibration energy is ultrasonic energy.

These and other features, aspects, and advantages of various embodiments will become better understood with reference to the following description, figures, and claims.

BRIEF DESCRIPTION OF THE DRAWINGS

Many aspects of this disclosure can be better understood with reference to the following figures.

Figure 1A:
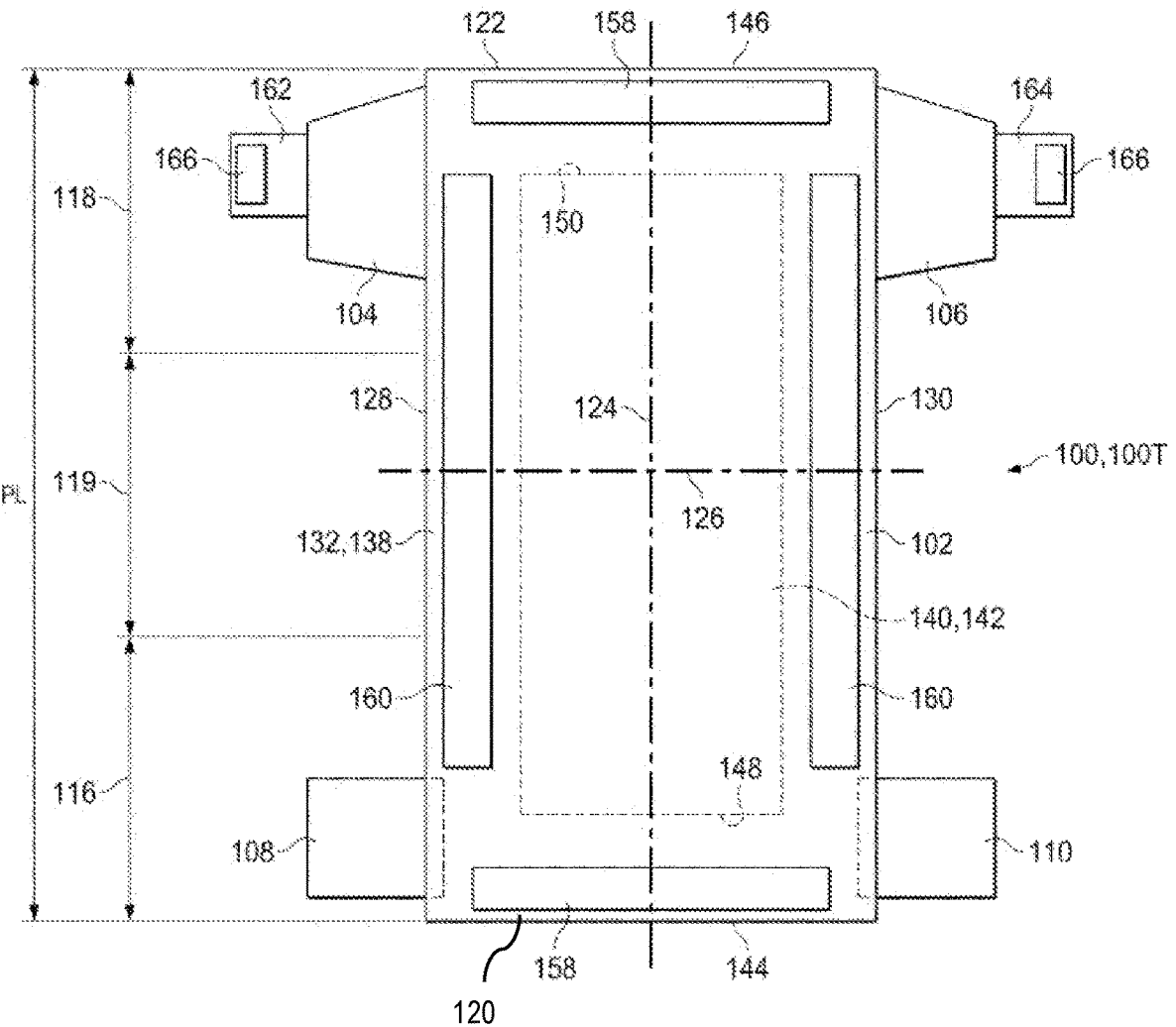
FIG. 1A is a schematic top view illustrating an example of an absorbent article manufactured with substrate having unitary protrusions, according to various embodiments.

It should be understood that the various embodiments are not limited to the examples illustrated in the figures.

DETAILED DESCRIPTION

Introduction and Definitions

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

In this specification and in the claims that follow, reference will be made to a number of terms that shall be defined to have the following meanings unless a contrary intention is apparent.

The term "machine direction" (MD) is used herein to refer to the direction of material flow through a process. In addition, relative placement and movement of material can be described as flowing in the machine direction through a process from upstream in the process to downstream in the process.

The term "cross direction" (CD) is used herein to refer to a direction that is generally perpendicular to the machine direction.

The term "nip" means a region between an outer surface of a first device (e.g. anvil roll with multiple protrusion-shaped cavities) and a second device (e.g. source of vibrational energy).

The term "altered area" means a region of a substrate that is altered in the nip, defined by an outer perimeter minus an island area within the outer perimeter.

The term "island area" means an area within the perimeter of the altered area that is not altered in the nip.

The term "integral area" means a rectangular area within the altered area having a width within the altered area that extends in the CD between perimeter edges of the altered area and a fixed length in the MD.

The term "simple area" means an area defined by an integral area based on a product of the width of the integral area in the CD and the fixed length of the integral area in MD.

The term "pattern of altered areas" means a plurality of adjacent altered areas along a substrate.

The term "portion of a substrate" means a region of the substrate that encompasses a plurality of adjacent altered areas and includes area outside the plurality of adjacent altered areas.

The term "nip area" means an area of the substrate within the nip at a given time.

The term "nip length" means a length of the nip area in the MD.

The term "nip width" means a width of the nip area in the CD.

The term "average area" means a sum of the simple areas of the integral areas within a nip area divided by the number of integral areas in the nip area.

The term "rate of change of the average area" means a difference in the average area between two nip areas over the altered area.

The term "rate of change of the average area (%)" means a ratio of a difference in the average area between a first nip area and a second nip area divided by the average area of the first nip area, multiplied by 100.

The term "rate of change of the simple area" means a difference in the simple area between two integral areas over the altered area.

The term "pattern balance" means a condition of the altered area defined by one or more of: a deviation of the simple area between any two integral areas within the altered area is less than a threshold value; a deviation of the average area of any two nip areas within the altered area is less than a threshold value; the simple area of any integral area within the altered area is within a threshold range; and the average area of any nip area within the altered area is within a threshold range.

The term "non-symmetrical shape" means a shape of the perimeter of the altered area which lacks corresponding points whose connecting lines are perpendicularly bisected by one of the CD or MD axes.

Absorbent Articles

An absorbent article will now be discussed, whose manufacture uses a substrate with unitary formed protrusions. FIG. 1A is a schematic top view illustrating an example of an absorbent article 100 manufactured with substrate having unitary protrusions, according to various embodiments. For purposes of this description, "absorbent article" is not limited to diapers, such as the tapered diaper 100T depicted in FIG. 1A. In particular, FIG. 1A shows a plan view of the diaper 100 with the portion of the diaper that faces toward a wearer oriented towards the viewer. The taped diaper 100T shown in FIG. 1A includes a chassis 102, first and second rear side panels 104 and 106; and first and second front side panels 108 and 110. As shown in FIG. 1A, the diaper 100 and the chassis 102 each include a first waist region 116, a second waist region 118, and a crotch region 119 disposed intermediate the first and second waist regions. The first waist region 116 may be configured as a front waist region, and the second waist region 118 may be configured as back waist region. In some configurations, the length of each of the front waist region, back waist region, and crotch region may be ⅓ of the length of the absorbent article 100. The absorbent article may also include a laterally extending front waist edge 120 in the front waist region 116 and a longitudinally opposing and laterally extending back waist edge 122 in the back waist region 118. To provide a frame of reference for the present discussion, the diaper 100T in FIG. 1A is shown with a longitudinal axis 124 and a lateral axis 126. The longitudinal axis 124 may extend through a midpoint of the front waist edge 120 and through a midpoint of the back waist edge 122. And the lateral axis 126 may extend through a midpoint of a first longitudinal or right side edge 128 and through a midpoint of a second longitudinal or left side edge 130.

As shown in FIG. 1A, the diaper 100 includes an inner, body facing surface 132. And the chassis 102 may include a backsheet (not shown) and a topsheet 138. The chassis 102 may also include an absorbent assembly 140, including an absorbent core 142, disposed between a portion of the topsheet 138 and the backsheet (not shown). As discussed in more detail below, the diaper 100 may also include other features, such as leg elastics and/or leg cuffs, an elastic waist region, and/or flaps, e.g., side panels and/or ears, to enhance the fits around the legs and waist of the wearer, to enhance the fit around the legs of the wearer.

The diaper 100 may also include various configurations of fastening elements to enable fastening of the front waist region 116 and the back waist region 118 together to form a closed waist circumference and leg openings once the diaper is positioned on a wearer. For example, as shown in FIG. 1A, the diaper 100 may include first and second fastening members 162, 164, also referred to as tabs, connected with the first and second rear side panels 104, 106, respectively. The diaper may also include first and second front side panels 108, 110, that may or may not include fastening members. With continued reference to FIG. 1A, each side panel 104, 106 and/or fastening member 162 and 164 may form a portion of or may be permanently bonded, adhered or otherwise joined directly or indirectly to the chassis 102 laterally inward from the side edge 128 and 130, in one of the front waist region 116 or the back waist region 118. Alternatively, the fastening members 162, 164 may form a portion of or may be permanently bonded, adhered or otherwise joined directly or indirectly to the first and second rear panels 104, 106 at or adjacent the distal edge of the panel and/or the first and second front side panels 108 and 110 at or adjacent the distal edge of the side panel. It is to be appreciated that the fastening members and/or side panels may be assembled in various ways, such as disclosed for example, in U.S. Pat. No. 7,371,302. The fastening members 162, 164 and/or side panels 104, 106, 108, 110 may also be permanently bonded or joined at or adjacent the side edges 128 and 130 of the chassis 102 in various ways, such as for example, by adhesive bonds, sonic bonds, pressure bonds, thermal bonds or combinations thereof, such as disclosed for example, U.S. Pat. No. 5,702,551.

Figure 1B:
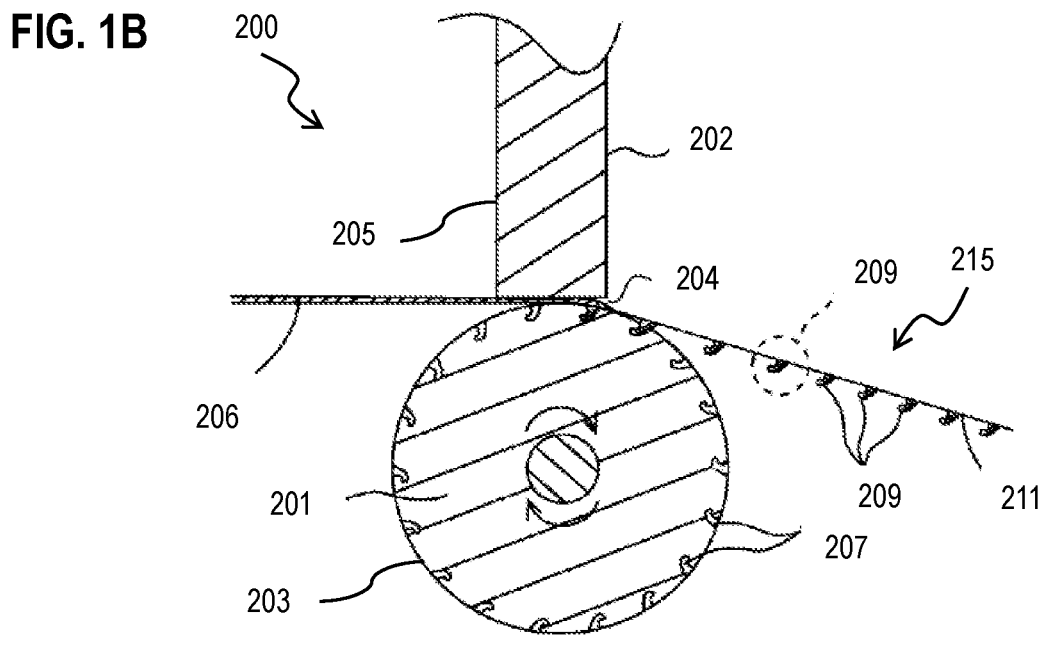
FIG. 1B is a schematic cross-sectional side view illustrating an example of an ultrasonic forming apparatus used to form unitary protrusions in a substrate, according to various embodiments.

Referring now to FIG. 1A, the first fastening member 162 and/or the second fastening member 164 may include various types of releasably engageable fasteners. The first and second fastening members 162 and/or 164 may also include various types of refastenable fastening structures. For example, the first and second fastening members 162 and 164 may include mechanical fasteners 166, in the form of hook and loop fasteners, hook and hook fasteners, macrofasteners, buttons, snaps, tab and slot fasteners, tape fasteners, adhesive fasteners, cohesive fasteners, magnetic fasteners, hermaphroditic fasteners, and the like. Some examples of fastening systems and/or fastening members 162, 164 are discussed in U.S. Pat. Nos. 3,848,594; 4,662,875; 4,846, 815; 4,894,060; 4,946,527; 5,151,092; 5,221,274; 6,251, 097; 6,669,618; 6,432,098; and U.S. Patent Publication Nos. 2007/0078427 A1 and 2007/0093769 A1. Additionally, another example of a fastening system includes a Back Ear design (uBER), as discussed in U.S. Pat. No. 9,533,067. System Used to Form Substrates for Absorbent Articles Apparatuses are now discussed, which are used to form a substrate used to make one or more components of the absorbent article 100 (e.g. fasteners 166, secondary fastening, disposal tapes, primary fastening, hybrid (diaper with reusable outer cover and disposable insert)). FIG. 1B is a schematic cross-sectional side view illustrating an example of an ultrasonic forming apparatus 200 used to form unitary protrusions 209 in a portion or patch 215 of a substrate 211, according to various embodiments. As shown in FIG. 1B, the apparatus 200 may include a first device 201 and a second device 202 with a nip 204 formed therebetween. The first device 201 may be an anvil roll comprising multiple hook-shaped or otherwise shaped cavities or recesses 207, along an outer periphery thereof. In one embodiment, the recesses 207 have a shape configured to produce the protrusions 209 which are suitable for use in a touch fastener of the absorbent article (e.g., fasteners 166). The second device 202 may be a source of vibrational energy 205, such as a blade sonotrode or a vibrating ultrasonic horn. The source of vibration energy 205 applies vibration energy to the substrate 211 intermittently or continuously.

A substrate 206 may be positioned or passed through the nip 204. The substrate 206 may be, but need not be limited to, a film, sheet, web, nonwoven, composite, laminate, or other form, or may be portions of a film, sheet, web, nonwoven, laminate or substrate thermoplastic material, portions of which may be used as a component of a touch fastener, for instance on an absorbent article. In their use on absorbent article, touch fasteners may be attached to a "side tab" or "ear" that the consumer uses to secure the absorbent article the wearer. These tabs may be constructed with a piece of extensible material to allow the side tab to stretch and flex when attached or when the wearer moves. The touch fasteners may also be used in a two-point fastening system on an absorbent article, where the component is positioned on a landing zone or outer cover of the absorbent article. The present disclosure further contemplates the use of preformed film, sheet, web, composite, laminate, etc. as a substrate material.

During operation, the second device 202 is positioned in close proximity to an outer surface 203 of the rotating first device 201 and in contact with the substrate 206 being processed. The first device 201 may also be a flat plate in other forms with the substate moving over the flat plate. The second device 202 may be vibrated at frequencies between about 50 Hz to about 50 kHz, as required. A portion of the substrate 206 in contact with, or in proximity with, the first device 201 and second device 202 may be softened by the vibration energy from the second device 202 and a desired portion of the substrate 206 may enter into the cavities 207 of the first device 201 to be shaped into protrusions 209 on the front surface of the film or sheet 211 as the first device 201 rotates in the direction indicated in FIG. 1B by the arrows. This process may be referred to as rotary forming. Force may be exerted on the substrate 206 as it passes through the nip 204 to apply a requisite amount of pressure to the softened substrate 206 to assist its entry and filling of at least some of, or all of, the cavities 207. One example of the process is described in U.S. Pat. No. 8,784,722.

In some embodiments, the cavities 207 of the first device 201 are formed based on the determined altered area(s) in the embodiments of the present invention discussed herein.

In some embodiments, the cavities 207 of the first device 201 are formed based on the shape of the determined altered area(s) of the embodiments of the present invention discussed herein. In one example embodiment, the cavities 207 are formed on the first device 201 within the outer perimeter of the altered area and the cavities 207 are not formed within the outer perimeter of the altered area for those areas corresponding to the island area(s) discussed herein.

In some embodiments, heat energy is imparted to the portion or patch 215 of the substrate 211 upstream of the nip 204 to heat the patch 215 of the substrate 211 to a temperature below a melting temperature of the patch 215 of the substrate 211, where the temperature below the melting temperature of the portion of the patch 215 is in a range of about 90 degrees C. to about 160 degrees C.

In various embodiments, the apparatus 200 includes a means of cooling the source of vibrational energy 205 or the first device 201.

Figure 1C:
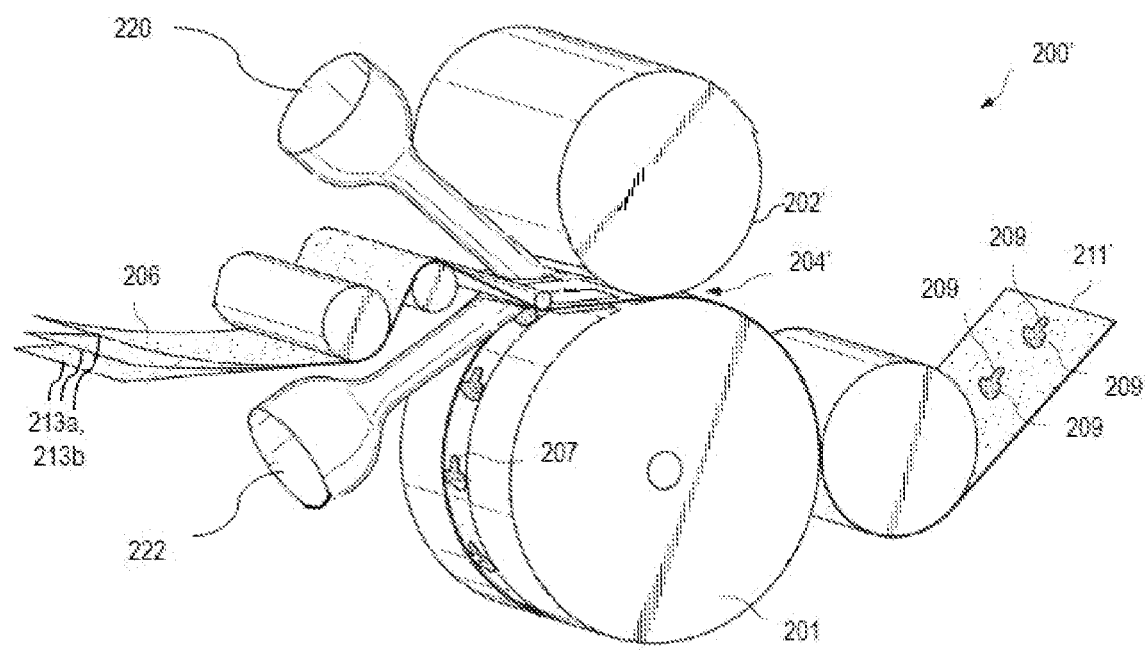
FIG. 1C is a schematic perspective side view illustrating an example of an ultrasonic forming apparatus used to form unitary protrusions in a substrate, according to various embodiments.

Although the embodiment of FIG. 1B depicts a blade sonotrode as the second device 202 in other embodiments different sonotrodes can be used as the second device. FIG. 1C is a schematic perspective side view illustrating an example of an ultrasonic forming apparatus 200' used to form unitary protrusions 209 in a substrate 211, according to various embodiments. The apparatus 200' includes similar components as the apparatus 200, with the exception of the features discussed herein. Unlike the apparatus 200 of FIG. 1B which features a blade sonotrode as the second device 202, the apparatus 200' of FIG. 1C features a rotary sonotrode as the second device 202' that is the source of ultrasonic energy. In various embodiments, FIG. 1C further depicts that the substrate 211 may include more than one layer 213a, 213b or more than one type of material. Additionally, the apparatus 200' may feature one or more substrate pre-heaters 220, 222 which may impart thermal energy to the substrate prior to the application of vibrational energy. The thermal energy may reduce the quantity of vibrational energy and/or time required to form a protrusion.

Figure 2A:
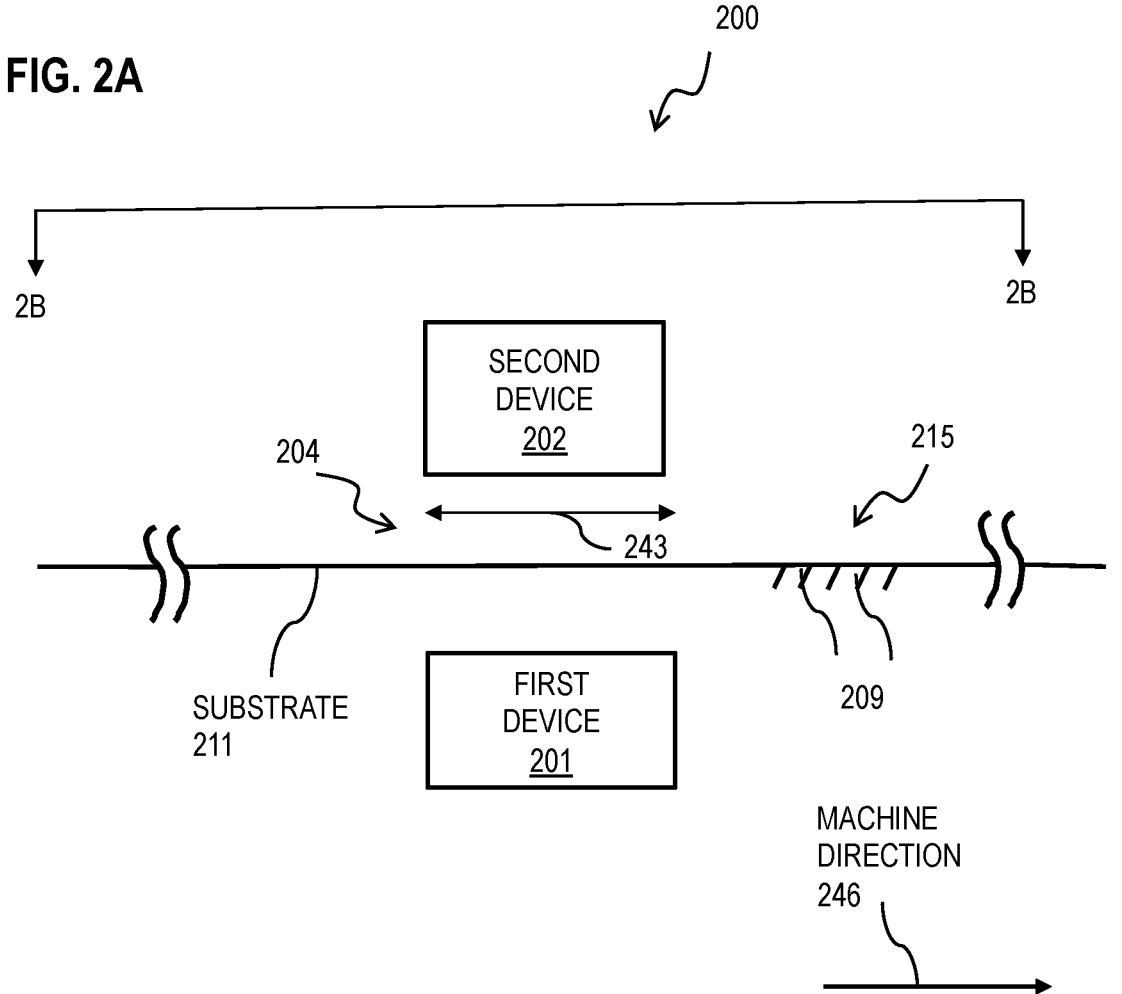
FIG. 2A is a block diagram illustrating an example of an apparatus used to form unitary protrusions in a substrate, according to various embodiments.
Figures 2B, 2C:
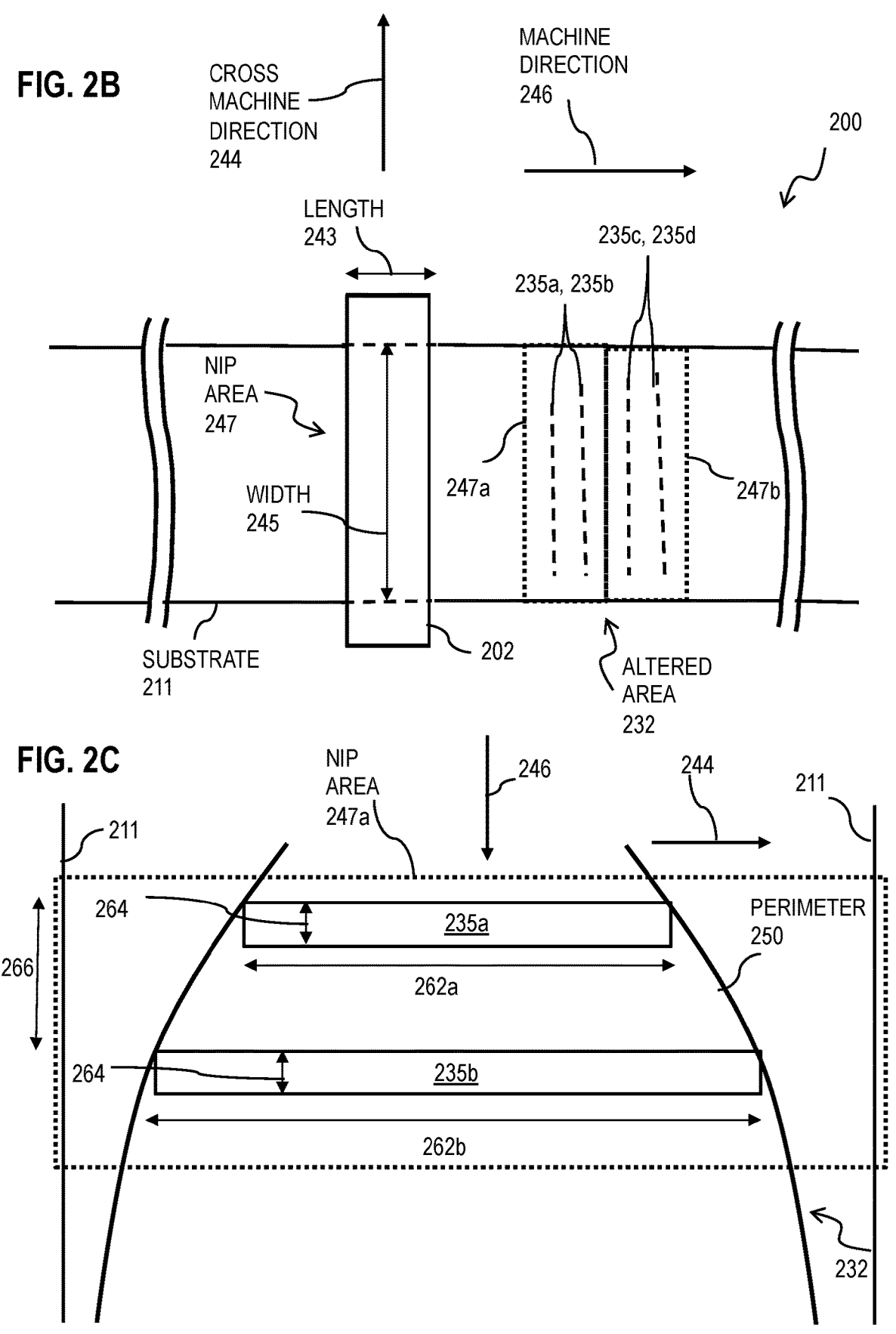
FIG. 2B is a block diagram illustrating an example of the apparatus of FIG. 2A taken along the line 2B-2B, according to various embodiments.
FIG. 2C is a block diagram illustrating an example of a top view of integral areas within a nip area of the substrate in FIG. 2B, according to various embodiments.

A nip area will now be discussed, which defines an area of the substrate 211 within the nip 204, 204' at any given time. FIG. 2A is a block diagram illustrating an example of the apparatus 200 used to form unitary protrusions 209 in the substrate 211, according to various embodiments. FIG. 2B is a block diagram illustrating an example of the apparatus 200 of FIG. 2A taken along the line 2B-2B, according to various embodiments. As shown in FIG. 2A, the substrate 211 extends in a machine direction (MD) 246 through the nip 204 of the apparatus 200. In one embodiment, the substrate 211 extends within nip 204 by a length 243 in the MD 246. In an example embodiment, the MD length 243 is in a range from about 4 mm to about 8 mm. FIG. 2B depicts a top view of the substrate 211 passing through the nip 204. As shown in FIG. 2B, the substrate 211 extends within the nip 204 in the cross-machine direction 244 by a width 245. In an example embodiment, the CD width 245 is in a range from about 20 mm to about 45 mm. In an example embodiment, the CD width 245 is a pattern width of the altered area and the width of the substrate 211 may extend beyond the CD width 245 (e.g. between about 180 mm and about 220 mm). In some embodiments, where the substrate 211 does not span the entire width of the apparatus 200 in the CD 244, the width 245 is less than a width of the apparatus 200 in the CD 244 at the nip 204. However, in other embodiments, the width 245 may be equal to a width of the apparatus 200 in the CD 244 at the nip 204. FIG. 2B depicts the nip area 247 which is an area of the substrate 211 within the nip 204 and based on a product of the MD length 243 and CD width 245.

Although the embodiments of FIGS. 1B and 1C discuss apparatuses 200, 200' that form protrusions 209 over a certain portion (also known as the altered area) of the substrate 211 and does not form protrusions 209 beyond the altered area, in other embodiments the apparatus 200, 200' forms protrusions 209 continuously over an entire area of the substrate 211, after which some portions of the substrate are flattened, which leaves intermittent areas of protrusions 209 that correspond to the altered area in the other embodiments. In one example embodiment, the flattening step is performed on a different manufacturing floor as the step of continuously forming protrusions 209 over the entire area of the substrate 211.

In an embodiment, an altered area 232 is a portion of the substrate 211 that is altered (e.g., over which protrusions 209 are formed) by the apparatus 200, 200'. In one embodiment, the altered area(s) are registered on the substrate 211 in the MD 246 and the CD 244. The registration of the altered area(s) on the substrate is disclosed in U.S. Pat. No. 9,763, 836B2; U.S. Pat. No. 6,764,563B2; U.S. Publication No. 2005/0125180A1; U.S. Pat. No. 8,244,393B2; and U.S. Patent Publication No. 2019/0060135A1 which are incorporated by reference herein.

Pattern Balance of an Altered Area of the Substrate

In some embodiments, not all of the substrate 211 that passes through the nip area 247 is altered by the apparatus 200, 200'. In these embodiments, that portion of the substrate 211 that is altered by the apparatus 200, 200 is defined as an altered area of the substrate 211. In these embodiments, protrusions 209 are only formed in the altered area of the substrate 211 and are not formed in regions of the substrate 211 outside the altered area. However, in other embodiments, protrusion 209 are continuously created over the substrate 211 after which certain portions of the substrate are flattened to leave intermittent areas that correspond to the altered area in the other embodiments.

FIG. 2C is a block diagram illustrating an example of a top view of the nip area 247 of the substrate 211 in FIG. 2B, according to various embodiments. In an embodiment, the altered area 232 is depicted in FIG. 2C and is defined as the area within an outer perimeter 250 along the substrate 211. In some embodiments, as shown in FIG. 2C, not all of the substrate 211 within the nip area 247a is altered by the apparatus 200, 200', since not all of the substrate 211 within the nip area 247a is also within the outer perimeter 250 of the altered area 232. However, in some embodiments, the entire nip area 247 of the substrate 211 may be within the outer perimeter 250 in which case the entire substrate 211 within the nip area 247 is altered by the apparatus 200, 200'. In an example embodiment, FIG. 2B depicts the altered area 232 which spans multiple nip areas 247a, 247b. Although FIG. 2B depicts the altered area 232 spanning two nip areas 247a, 247b for purposes of illustration, in other embodiments the altered area 232 may only span one nip area 247 or more than two nip areas 247a, 247b. In further embodiments, although FIGS. 2B and 2C depict one altered area 232, in other embodiments a pattern of more than one altered area 232 is provided along the portion 215 of the substrate 211.

The inventors of the present invention recognized that the altered area of the substrate 211 (e.g. area of the substrate altered within the one or more nip areas 247) can be used to improve the performance of the apparatus 200, 200'. One or more parameters were developed that are associated with the altered area of the substrate 211. These parameters can be determined across multiple altered areas 232 over the portion 215 of the substrate 211. A desired condition of the altered area(s) 232, known as pattern balance, is achieved when values of one or more of these parameters are within certain threshold ranges. The inventors of the present invention recognized that achieving this pattern balance with the altered area(s) 232 advantageously results in performance advantages with the apparatus 200, 200'. These performance advantages include, but are not limited to: maintenance of sufficient contact forces in the nip 204, 204' to ensure sufficient flow of material to form the protrusions 209; and optimization of one or more control loops of the apparatus 200, 200' that ensure system parameters (e.g. frequency, amplitude, etc.) are maintained within desired threshold ranges. Each of the one or more parameters will now be discussed.

A first parameter is an average area of the substrate 211 that is altered within each nip area 247 over the altered area 232. In order to approximate the average area of the substrate 211 altered within each nip area 247, one or more integral areas 235 are defined within each nip area 247. As shown in FIG. 2C, in one embodiment the integral areas 235 are rectangles that have a fixed length 264 in the MD 246 and a variable width 262 in the CD 244 that extends within the outer perimeter 250 of the altered area 232. The integral areas 235 are spaced apart by a fixed spacing 266 in the MD 246. In some embodiments, values of the fixed spacing 266 and fixed length 264 are selected so that a desired number (e.g. between 2-10) of integral areas 235 are within each nip area 247. In this embodiment, the integral areas 235 encompass areas of the substrate 211 that are altered within each nip area 247.

In this embodiment, the first parameter defines the average area of the substrate 211 altered within each nip area 247 as a sum of an area of the integral areas 235 within the nip area 247 divided by the number of integral areas 235 in the nip area 247. The area of each integral area 235 is defined as a simple area of the integral area 235. As shown in FIG. 2C, the area of the first integral area 235a is a product of the fixed length 264 and the first width 262a and the area of the second integral area 235b is a product of the fixed length 264 and the second width 262b. Although rectangular integral areas 235 are depicted in FIG. 2C, in other embodiments any polygon can be used to define the integral areas 235 in which case the area formula for that polygon would be used to compute the simple area of each integral area and the average area of the substrate that is altered within each nip area. In these embodiments, the average area of the substrate 211 that is altered within each nip area 247 over the altered area 232 is determined and is compared with a threshold value range (e.g. whether it is greater than a minimum threshold average area value and less than a maximum threshold average area value). In an example embodiment, the minimum threshold average area value is about 15 mm$^2$ and the maximum threshold average area value is about 30 mm$^2$. In another example embodiment, the minimum threshold average area value is about 10 mm$^2$ and the maximum threshold average area value is about 40 mm$^2$. Thus, in these example embodiments, the ratio of the maximum threshold average area value to the minimum threshold average area value is no more than 4:1, preferably no more than 3:1, and more preferably no more than 2:1. In an example embodiment, these minimum and maximum threshold average area values exclude the leading edge and trailing edge portion of the altered area (where the average area value is zero for all altered area shapes). In an embodiment, the average area of the substrate 211 will change based on the variable width 262 of those integral areas 235 within the nip area 247. In an example embodiment, most of the integral areas 235 have a variable width 262 of about 20 mm except for those integral areas 235 within an arm 239 of the altered area 232' (see FIGS. 3A and 3B). In yet another example embodiment, for a rectangular altered area with a variable width 262 of about 20 mm, the simple area of each integral area 235 within the nip area 247 is about 20 mm² and thus the average area within the nip area 247 is about 20 mm². In yet another example embodiment, for an inventive shape (e.g. the altered areas of FIGS. 3A-3B and FIGS. 4A-4B) the average area within the nip 247 is no more than 40 mm².

As shown in FIG. 2B, in one embodiment the altered area 232 encompasses two nip areas 247a, 247b where two integral areas 235a, 235b are defined within the first nip area 247a and two integral areas 235c, 235d are defined within the second nip area 247b. In an embodiment, the average area of the substrate 211 that is altered within each nip area 247a, 247b is determined. In an example embodiment, the average value of the substrate 211 that is altered within the first nip area 247a is based on a sum of the simple areas of the integral areas 235a, 235b divided by two (the number of integral areas 235a, 235b within the first nip area 247a). Similarly, in this example embodiment, the average value of the substrate 211 that is altered within the second nip area 247b is based on a sum of the simple areas of the integral areas 235c, 235d divided by two (the number of integral areas 235c, 235d within the second nip area 247b). In this example embodiment, these determined values for the average area of the substrate 211 that is altered within the nip areas 247a, 247b are then each compared with the threshold value range. In an embodiment where the first parameter is used, if these determined average area values are within the threshold value range, the altered area 232 has pattern balance. In some embodiments, where multiple altered areas 232 span the portion 215 of the substrate 211, if the determined average area values are within the threshold value range across the multiple altered areas 232, pattern balance is achieved across the altered areas 232.

A second parameter is the simple area of each integral area 235 within the nip area(s) 247 over the altered area 232. In this embodiment, the simple area of each integral area 235 in the nip area(s) 247 over the altered area 232 is determined. These simple area values are then compared with a threshold value range (e.g. whether it is greater than a minimum threshold simple area value and less than a maximum threshold simple area value). In an example embodiment, the minimum threshold simple area value is within a range that is similar to the minimum threshold average area value that was previously discussed. In an example embodiment, the maximum threshold simple area value is within a range that is similar to the maximum threshold average area value previously discussed. In the embodiment of FIG. 2C, the simple areas of the integral areas 235a, 235b are each determined and then each compared with the threshold value range. Similarly, for the embodiment of FIG. 2B, the simple areas of the integral areas 235a, 235b, 235c, 235d within the nip areas 247a, 247b over the altered area 232 are determined and then each compared with the threshold value range. In an embodiment where the second parameter is used, if these determined simple area values are within the threshold value range, the altered area 232 has achieved pattern balance. In some embodiments, where multiple altered areas 232 span the portion 215 of the substrate 211, if the determined simple areas are within the threshold value range across the multiple altered areas 232, pattern balance is achieved across the altered areas 232. In another embodiment, instead of the simple area of each integral area 235 over the altered area 232, the second parameter can be a dimension of the integral area (e.g. variable width 262 in CD 244). In an example embodiment, pattern balance is achieved if the value of the variable width 262 in CD 244 of each integral area 235 of the altered area 232 is within a threshold range (e.g. greater than a minimum width and less than a maximum width). In an example embodiment, the minimum width is about 20 mm and the maximum width is about 45 mm.

A third parameter is a rate of change of the average area of the substrate 211 that is altered between two nip areas 247 of the altered area 232. The average area for each nip area 247 is determined as previously discussed for the first parameter. In some embodiments, the rate of change is based on a change in the average area value between any two nip areas 247 of the altered area 232. In other embodiments, the rate of change is based on a change in the average area value between two adjacent or consecutive nip areas 247 of the altered area 232. This rate of change value is then assessed to determine whether it is less than a threshold value (e.g. whether it is less than a maximum rate of change value). In some embodiments, the threshold value is an area value (e.g. a difference between the average area of two different nip areas). In other embodiments, the threshold value is a percentage value (e.g. a difference between the average area between a first and second nip area, divided by the average area at the first nip area, multiplied by 100). In an example embodiment, the maximum rate of change value is within +1-50% and more preferably within +50%/−25% of a nominal value throughout the altered area, excluding the leading and trailing edges. In one example embodiment, the maximum rate of change value for a rectangular shaped altered area may be +/−20 mm² area change (e.g., per mm of rotation of the outer surface 203). In another example embodiment, for an inventive shape (e.g. the altered area of FIG. 3A) the maximum rate of change value may be limited to a range from about −10 mm² to about +10 mm² (e.g. in-nip area per mm of rotation of the outer surface 203). A more balanced shaped altered area (e.g. FIG. 3B) may reduce the maximum rate of change value to a range from about −8 mm² to about +8 mm² (e.g. per mm of rotation of the outer surface 203). In some embodiments, these maximum rate of change values are dependent on the basic nip area 247, and thus altered areas with larger CD widths 262 will change the scale of these values. In these embodiments, a rectangular altered area may have a maximum rate of change value between about −100% and +100% of the full nip area 247 in mm² per mm of rotation of the outer surface 203. Additionally, in these embodiments inventive shapes may have a maximum rate of change value between about −50% and +50%, or more preferably between about −25% and about +25% of the full nip area 247 in mm² per mm of rotation of the outer surface 203. In some embodiments, the maximum rate of change value applies to the leading edge, a central region of said patch, and/or a trailing edge of the altered area.

In the embodiment of FIG. 2B, the rate of change is determined based on a deviation or change between the average area of the substrate 211 altered in the first nip area 247a and the average area of the substrate 211 altered in the second nip area 247b. In some embodiments, the third parameter is expressed as a percentage. In the example embodiment of FIG. 2B, the rate of change is determined based on a difference between the average area in the first nip area 247a and the average area of the second nip area 247b divided by the average area in the first nip area 247a and multiplying this ratio by 100. In an embodiment where the third parameter is used, if the determined rate of change value is less than the threshold value, the altered area 232 has achieved pattern balance. In some embodiments, where multiple altered areas 232 span the portion 215 of the substrate 211, if the determined rate of change is less than the threshold value across the multiple altered areas 232, pattern balance is achieved across the altered areas 232.

A fourth parameter is a rate of change of the simple area between two integral areas 235 of the altered area 232. The simple area for each integral area 235 is determined as previously discussed for the second parameter. In some embodiments, the rate of change is based on a change in the simple area value between any two integral areas 235 of the altered area 232 (e.g. between integral area 235*a* and integral area 235*d* of the altered area 232 in FIG. 2B). In other embodiments, the rate of change is based on a change in the simple area value between two adjacent or consecutive integral areas 235 of the altered area 232 (e.g. between integral areas 235*a*, 235*b* of the altered area 232 of FIG. 2B). This rate of change value is then assessed to determine whether it is less than a threshold value (e.g. whether it is less than a maximum rate of change value). In an example embodiment, the maximum rate of change value between the integral areas is similar to the maximum rate of change value between the average areas that was previously discussed. In an example embodiment, the maximum rate of change value between the integral areas is within a range that is similar to the maximum rate of change between the average areas that was previously discussed. In some embodiments, the fourth parameter is expressed as a percentage. In the example embodiment of FIG. 2B, the rate of change is determined based on a difference between the simple area in the first integral area 235*a* and the simple area of the second integral area 235*b* divided by the simple area in the first integral area 235*a* and multiplying this ratio by 100. In an embodiment where the fourth parameter is used, if the determined rate of change value is less than the threshold value, the altered area 232 has achieved pattern balance. In some embodiments, where multiple altered areas 232 span the portion 215 of the substrate 211, if the determined rate of change is less than the threshold value across the multiple altered areas 232, pattern balance is achieved across the altered areas 232.

Although four parameters are discussed above, the parameters are not limited to one or more of those four parameters and include any other parameters that can be developed to quantify the average area of the substrate 211 altered within each nip area 247 of the altered area 232.

In the embodiment of FIG. 2C, the entire area within the outer perimeter 250 of the altered area 232 is altered by the apparatus 200, 200'. However, the inventors of the present invention recognized that pattern balance cannot be achieved for some altered areas where the entire area within the outer perimeter 250 is altered by the apparatus 200, 200'. Thus, the inventors of the present invention developed a method for designating an area within the outer perimeter 250 that is not altered by the apparatus 200, 200' (known as an "island area") so that the altered area achieves pattern balance. The following embodiments discuss a method that is used to designate an island area within the outer perimeter, so that the altered area achieves pattern balance.

Figures 3A, 3B:
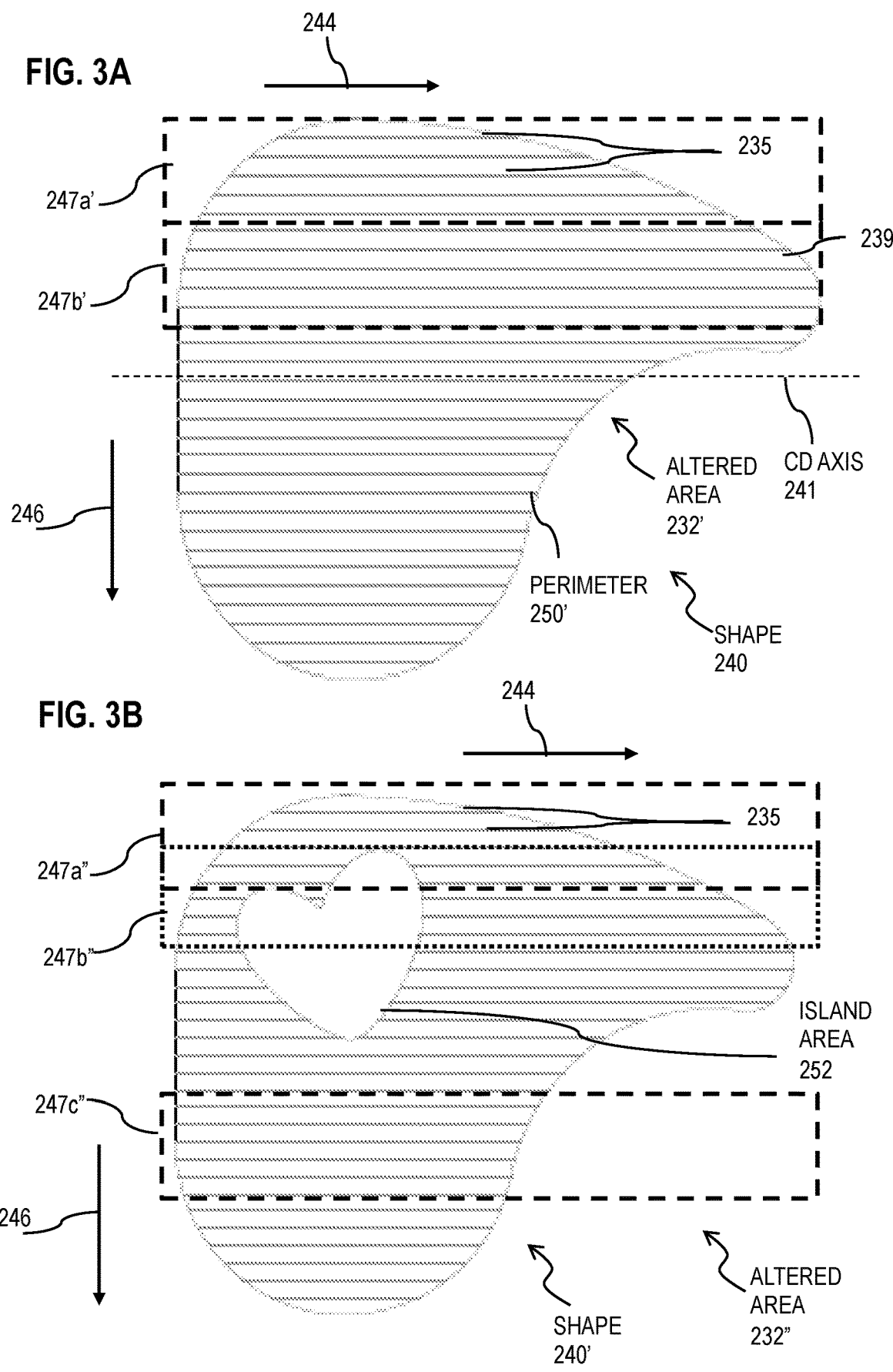
FIG. 3A is an image illustrating an example of a top view of a first altered area of the substrate in FIG. 2B being altered by the apparatus, according to various embodiments.
FIG. 3B is an image illustrating an example of a top view of a second altered area of the substrate in FIG. 2B being altered by the apparatus, according to various embodiments.

An altered area is now discussed prior to designating the island area (FIG. 3A) and after designating the island area (FIG. 3B) and how the designation of the island area achieves pattern balance of the altered area. FIG. 3A is an image illustrating an example of a top view of a first altered area 232' of the substrate 211 in FIG. 2B being altered by the apparatus 200, 200', according to various embodiments. In some embodiments, the altered area 232' takes a shape 240 known as an "airpod". In one embodiment, the shape 240 is a non-symmetrical shape, since the perimeter 250' of the altered area 232' lacks corresponding points whose connecting lines are perpendicularly bisected by one of the CD or MD axes. Specifically, as shown in FIG. 3A, an arm 239 of the perimeter 250' that extends in the CD 244 does not have corresponding points whose connecting lines are perpendicularly bisected by a CD axis 241. However, in other embodiments the shape 240 is symmetrical such that the perimeter of the altered area has corresponding points whose connecting lines are perpendicularly bisected by one of the CD or MD axes. In an embodiment, the arm 239 of the altered area 232' extends beyond a fold line used in forming the absorbent article 100, as disclosed in U.S. Pat. Nos. 9,265,674 and 9,265,673 which are incorporated by reference herein.

In an embodiment, an entire area of the substrate 211 within the outer perimeter 250' of the altered area 232' is altered by the apparatus 200, 200'. A pair of adjacent nip areas 247*a'*, 247*b'* are depicted in FIG. 3A, as well as integral areas 235 within the nip areas 247*a'*, 247*b'*. In the example embodiment of FIG. 3A, pattern balance is not achieved by the altered area 232' since one or more of the parameter values are not within the respective threshold range for each parameter. In one example embodiment, a rate of change of the average area of the substrate 211 altered between the two nip areas 247*a'*, 247*b'* exceeds the maximum rate of change threshold value. Specifically, the average area of the substrate 211 that is altered in the second nip area 247*b'* is much larger than the average area of the substrate 211 that is altered in the first nip area 247*a'*. Similarly, other parameters demonstrate pattern balance is not achieved by the altered area 232'. In another example, the value of the simple area of the integral areas 235 within the second nip area 247*b'* exceeds a maximum area value threshold. In yet another example, a rate of change of the simple area between integral areas 235 of the altered area 232' exceeds the maximum rate of change threshold value (e.g. note that the simple area of the integral areas 235 within the second nip area 247*b'* are much larger than the simple area of the integral areas 235 within the first nip area 247*a'*).

FIG. 3B is an image illustrating an example of a top view of a second altered area 232" of the substrate 211 in FIG. 2B being altered by the apparatus 200, 200', according to various embodiments. In some embodiments, the altered area 232" takes a shape 240' that is similar to the shape 240 with the removed island area 252. In an example embodiment, the shape 240' is non-symmetrical for a similar reason as the shape 240 (e.g. arm 239). In an embodiment, the altered area 232" is the same as the altered area 232' of FIG. 3A with the exception of an island area 252 (e.g. heart shaped) within the outer perimeter 250' that is not altered by the apparatus 200, 200'. The inventors recognized that designating the island area 252 within the outer perimeter 250' advantageously achieves pattern balance with the altered area 232" of FIG. 3B that was not present with the altered area 232' of FIG. 3A. As shown in FIG. 3A, the altered area 232' has an increased width in the CD 244 from the first nip area 247*a'* to the second nip area 247*b'*, resulting in one or more parameter values being outside the threshold range. The island area 252 of the altered area 232" of FIG. 3B offsets this increased width in the CD 244 of the altered area 232" between the first nip area 247*a"* and the second nip area 247*b"*, resulting in the one or more parameter values being within the threshold range. Although the nip areas 247*a"*, 247*b"* are partially overlapping, the nip areas can be adjacent and non-overlapping as with the nip areas 247*a*', 247*b*' of FIG. 3A. In one example embodiment, a rate of change of the average area of the substrate 211 altered between the two nip areas 247*a*", 247*b*" is within the threshold range since the island area 252 reduced the average area of the substrate altered in the second nip area 247*b*" (as compared with the altered area 232'). In another example embodiment, the simple area of the integral areas 235 within the altered area 232" are within the threshold range, since the island area 252 reduces the simple area of those integral areas 235 within the second nip area 247*b*" (which would otherwise exceed the threshold range). The third nip area 247*c*" of FIG. 3B does not include the island area 252 since the CD width 244 of the altered area 232" in the third nip area 247*c*" is not widened as in the nip area 247*b*" and thus the island area 252 need not extend into the third nip area 247*c*" to achieve pattern balance.

Figure 4A:
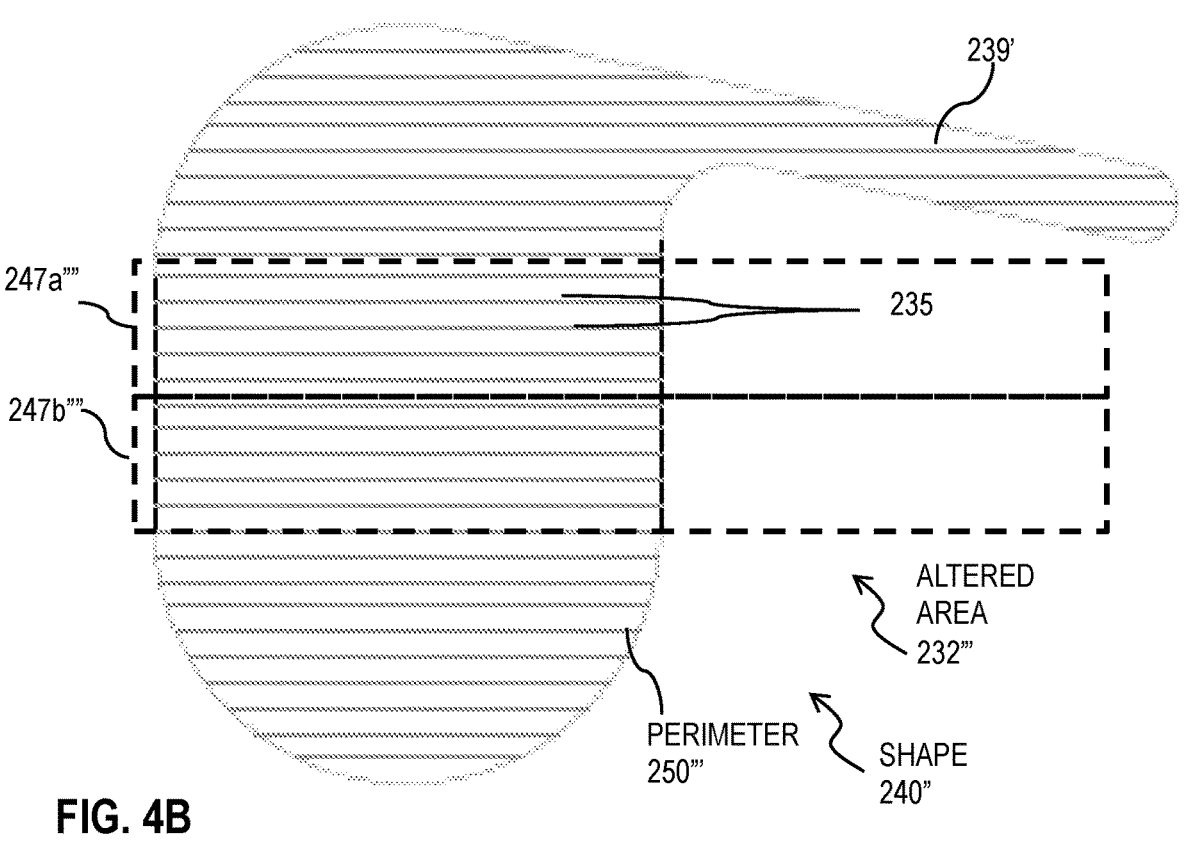
FIG. 4A is an image illustrating an example of a top view of a third altered area of the substrate in FIG. 2B being altered by the apparatus, according to various embodiments.

An altered area is now discussed prior to designating the island area (FIG. 4A) and after designating the island area (FIG. 4B) and how the designation of the island area did not achieve pattern balance of the altered area. FIG. 4A is an image illustrating an example of a top view of an altered area 232''' of the substrate 211 altered by the apparatus 200, 200', according to various embodiments. In some embodiments, the altered area 232''' takes a shape 240" known as an "oval". In one embodiment, the shape 240" is a non-symmetrical shape, since the perimeter 250" of the altered area 232''' lacks corresponding points whose connecting lines are perpendicularly bisected by one of the CD or MD axes. Specifically, as shown in FIG. 4A, an arm 239' of the perimeter 250" that extends in the CD 244 does not have corresponding points whose connecting lines are perpendicularly bisected by one of the CD or MD axes. In an embodiment, the arm 239' of the altered area 232''' extends beyond a fold line used in forming the absorbent article 100, as disclosed in U.S. Pat. Nos. 9,265,674 and 9,265,673 which are incorporated by reference herein.

In an embodiment, an entire area of the substrate 211 within the outer perimeter 250''' of the altered area 232''' is altered by the apparatus 200, 200'. In the example embodiment of FIG. 4A, pattern balance is achieved by the altered area 232''' since one or more of the parameter values are within the respective threshold range for each parameter. In one example embodiment, a rate of change of the average area of the substrate 211 altered between the two nip areas 247*a*''', 247*b*''' is within a threshold range for the rate of change. Specifically, the average area of the substrate 211 that is altered in the second nip area 247*b*" is about equal to the average area of the substrate 211 that is altered in the first nip area 247*a*". Similarly, other parameters demonstrate pattern balance is achieved by the altered area 232". In another example, the value of the simple area of the integral areas 235 within the nip areas 247*a*", 247*b*" are within a threshold value range. In yet another example, a rate of change of the simple area between integral areas 235 of the altered area 232''' is within a threshold range for the rate of change (since the simple area of the integral areas 235 are about equal across the nip areas 247*a*", 247*b*").

Figure 4B:
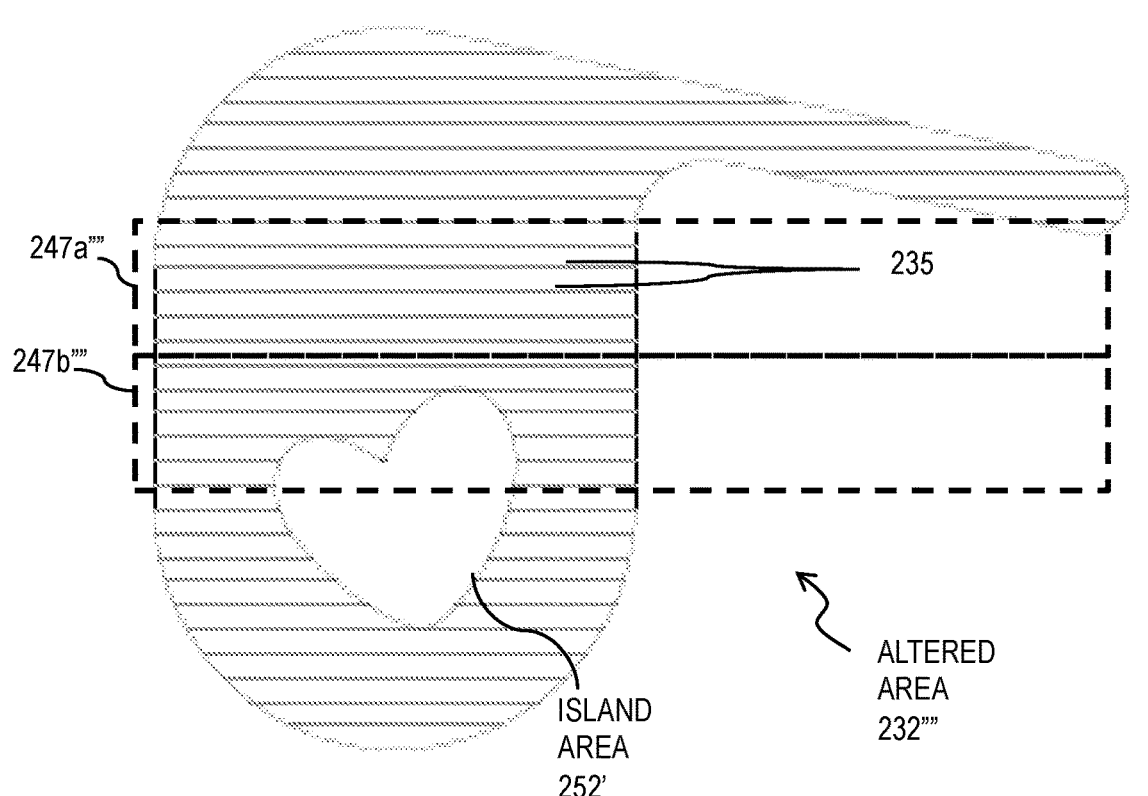
FIG. 4B is an image illustrating an example of a top view of a fourth altered area of the substrate in FIG. 2B being altered by the apparatus, according to various embodiments.

FIG. 4B is an image illustrating an example of a top view of an altered area 232'''' of the substrate 211 in FIG. 2B being altered by the apparatus 200, 200', according to various embodiments. In some embodiments, the altered area 232'''' takes a shape that is similar to the shape of the altered area 232''' with the removed island area 252'. In an embodiment, the altered area 232'''' is the same as the altered area 232''' of FIG. 4A with the exception of the island area 252' (e.g. heart shaped) within the outer perimeter 250''' that is not altered by the apparatus 200, 200'. The inventors recognized that designating the island area 252' within the outer perimeter 250''' does not achieve pattern balance with the altered area 232'''' of FIG. 4B. As shown in FIG. 4A, the altered area 232''' has a relatively fixed increased width in the CD 244 from the first nip area 247*a*' to the second nip area 247*b*''', resulting in one or more parameter values being within the threshold range of each parameter. The island area 252' of the altered area 232'''' of FIG. 4B introduces variation in the width along the CD 244 of the altered area 232'''' between the first nip area 247*a*'''' and the second nip area 247*b*''', and thus results in parameter values falling outside the threshold range. Thus, the inventors of the present invention recognized that the island area 252' of FIG. 4B should not be utilized in forming the altered area 232'''' and instead the altered area 232''' of FIG. 4A is preferred which does achieve pattern balance. In an alternative embodiment, the island area 252' is reshaped and/or repositioned and/or resized within the outer perimeter 250''' (e.g. closer to the top of the altered area 232'''' where the CD width 262 widens into the arm 239') in order to maintain or improve the pattern balance of the altered area.

Method for Altering A Substrate

Figure 5:
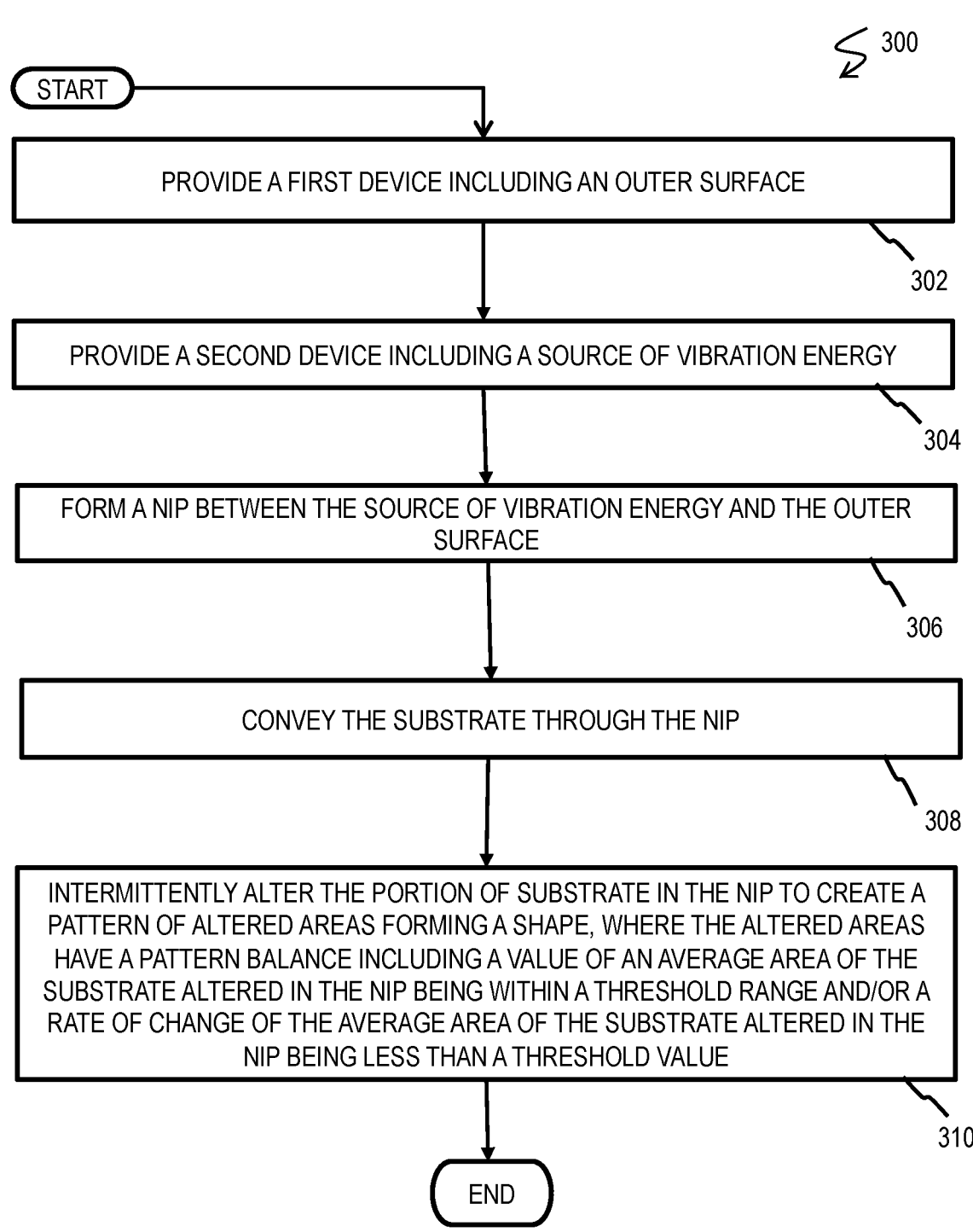
FIG. 5 is a flowchart illustrating an example of a method used to form unitary protrusions in a substate, according to various embodiments.

A flowchart will now be discussed which shows one or more steps of a method to alter a substrate using the apparatus 200, 200'. FIG. 5 is a flow diagram that illustrates an example of a method 300 for altering a substrate with the apparatus 200, 200'. Although the flow diagram of FIG. 5 is depicted as integral steps in a particular order for purposes of illustration, in other embodiments one or more steps, or portions thereof, are performed in a different order, or overlapping in time, in series or in parallel, or are deleted, or one or more other steps are added, or the method is changed in some combination of ways.

In step 302, a first device is provided that includes an outer surface. In one embodiment, in step 302 the first device 201 is provided with the outer surface 203.

In step 304, a second device is provided that includes a source of vibration energy. In some embodiments, in step 304 the second device 202 is a blade sonotrode. In other embodiments, in step 304 the second device 202' is a rotary sonotrode.

In step 306, a nip is formed between the source of vibration energy and the outer surface of the first device. In one embodiment, in step 306 the nip 204 is formed between the second device 202 and the outer surface 203 of the first device 201. In another embodiment, in step 306 the nip 204' is formed between the second device 202' and the outer surface 203 of the first device 201.

In step 308, substrate is conveyed through the nip formed in step 306. In one embodiment, in step 308 the substrate 206 (no protrusions 209) is conveyed in step 308 through the nip 204 (FIG. 1B) or the nip 204' (FIG. 1C).

In step 310, a portion of the substrate is intermittently altered in the nip to create a pattern of altered areas forming a shape. In one embodiment, in step 310 the portion 215 of the substrate 211 is intermittently altered in the nip 204, 204' to create a pattern of altered areas forming a shape. In one embodiment, in step 310 the altered area 232, 232", 232'''' have a pattern balance. Although FIGS. 2B through 4B depict various altered areas, the altered areas created in step 310 are not limited to these particular altered areas and include any altered area(s) created on the portion of the substrate that achieve pattern balance. In an example embodiment, the pattern balance of the altered areas formed in step 310 is based on one or more of the previously discussed parameters having values that are within the threshold range for each parameter value over the altered areas.

Result data will now be discussed, which demonstrates how the embodiments of the present invention improved the altered areas by achieving pattern balance. Graphs are now presented which demonstrate that the value of the one or more parameters used to demonstrate pattern balance of the altered areas were enhanced. In some embodiments, these parameter values were enhanced by adding an island area within the outer perimeter of the altered area. However, as discussed with respect to FIGS. 4A and 4B, in other embodiments pattern balance was achieved by not adding an island area within the outer perimeter. In still other embodiments, where the island area does not achieve pattern balance of the altered area, the island area can be reshaped, repositioned and/or resized in order to achieve pattern balance of the altered area.

Figure 6A:
FIG. 6A is a graph that illustrates an example of curves indicating an average area being altered in the nip area for different altered areas, according to various embodiments.
Figure 6A:
Figure 6A:
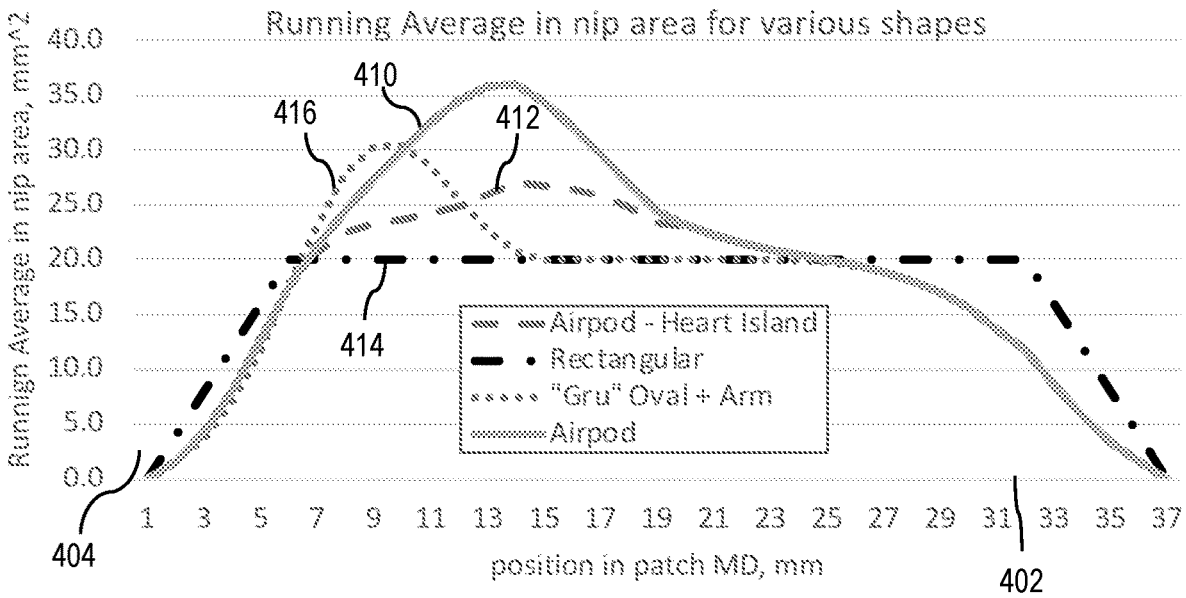

FIG. 6A is a graph 400 that illustrates an example of curves 410, 412, 414, 416 indicating an average area being altered in the nip area for different altered areas, according to various embodiments. The horizontal axis 402 is position along the MD 246 in units of millimeters (mm). The vertical axis 404 is the average altered area of the substrate in the nip area, in units of squared millimeters (mm$^2$). The first curve 410 indicates the average area value of the substrate 211 being altered in the nip areas 247' of the altered area 232' of FIG. 3A. The second curve 412 indicates the average area value of the substrate 211 being altered in the nip areas 247" of the altered area 232" of FIG. 3B. Note that the second curve 412 indicates that the average area value is reduced and has less variation along the altered area 232", as compared to the altered area 232' along the same position along the MD 246 (e.g. between about 7 mm and 21 mm). This confirms that the island area 252 of the altered area 232" prevented the average area value from exceeding a maximum threshold value (e.g. 30 mm$^2$) and thus achieving pattern balance of the altered area 232" which was not attained with the altered area 232'. The third curve 416 indicates the average area value of the substrate 211 being altered in the nip areas 247''' of the altered area 232''' of FIG. 4A. The fourth curve 414 indicates the average area value of the substrate 211 being altered in the nip areas of a rectangular altered area (not shown). Thus, in some embodiments the fourth curve 418 serves as an ideal to compare with the curves for the non-rectangular active areas.

Figure 6B:
FIG. 6B is a graph that illustrates an example of curves indicating a rate of change of the average area being altered in the nip area for different altered areas, according to various embodiments.
Figure 6B:
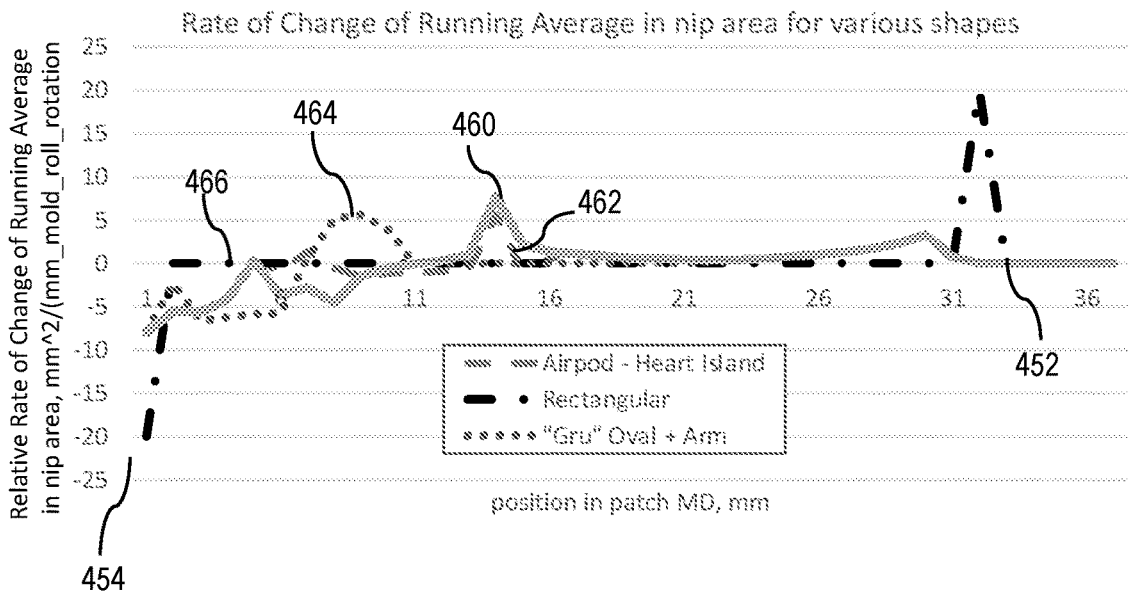

FIG. 6B is a graph 450 that illustrates an example of curves 460, 462, 464, 466 indicating a rate of change of the average area being altered in the nip area for different altered areas, according to various embodiments. The horizontal axis 452 is position along the MD 246 in units of millimeters (mm). The vertical axis 454 is the rate of change of the average altered area of the substrate in the nip area, in units of squared millimeters (mm$^2$). The first curve 460 indicates the rate of change of the average area value of the substrate 211 being altered in the nip areas 247' of the altered area 232' of FIG. 3A. The second curve 462 indicates the rate of change of the average area value of the substrate 211 being altered in the nip areas 247" of the altered area 232" of FIG. 3B. Note that the second curve 462 indicates that the rate of change is reduced along the altered area 232" compared to the altered area 232' along the same position along the MD 246 (e.g. between about 13 mm and 16 mm). This confirms that the island area 252 of the altered area 232" prevented the rate of change of the average area value from exceeding a maximum threshold value (e.g. 5 mm$^2$) and thus achieving pattern balance of the altered area 232" which was not attained with the altered area 232'. The third curve 464 indicates the rate of change of the average area value of the substrate 211 being altered in the nip areas 247''' of the altered area 232''' of FIG. 4A. The fourth curve 466 indicates the rate of change of the average area value of the substrate 211 being altered in the nip areas of a rectangular altered area (not shown). Thus, in some embodiments the fourth curve 466 serves as an ideal (zero rate of change) to compare with the curves for the non-rectangular active areas.

Example Embodiments

Figure 7A:
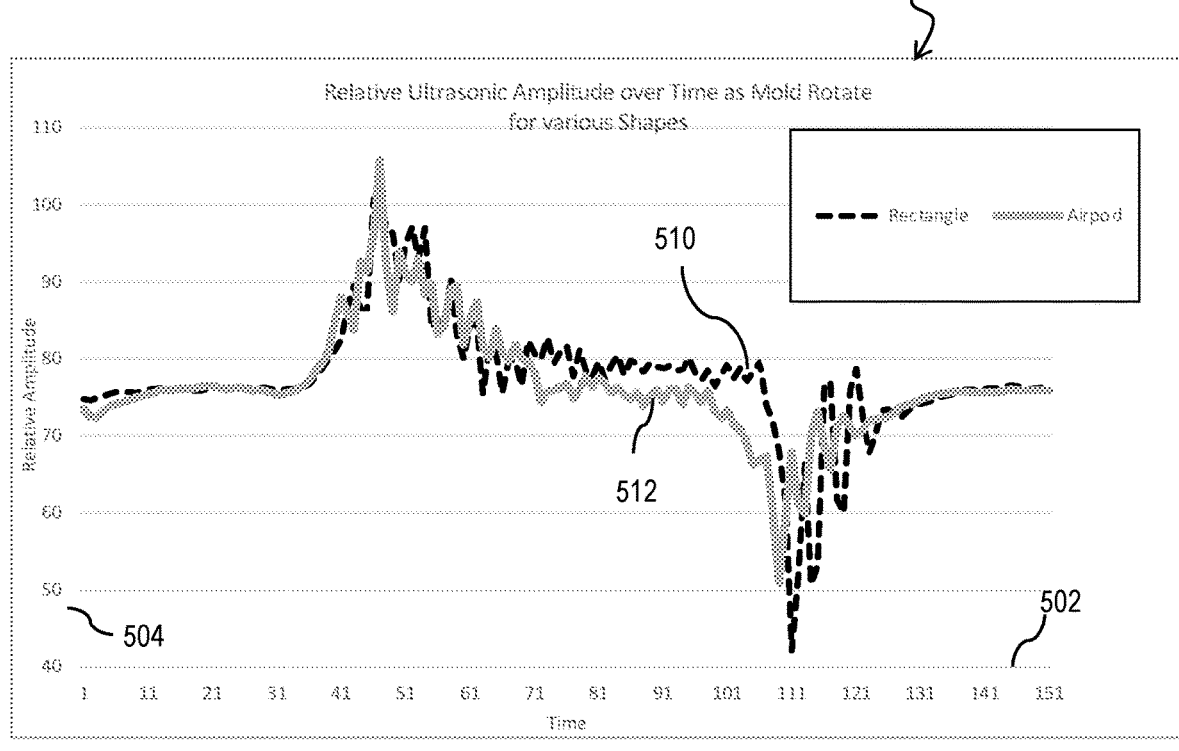
FIG. 7A is a graph that illustrates an example of curves indicating an ultrasonic amplitude of the ultrasonic apparatus for different shaped altered areas, according to various embodiments.
Figure 7B:
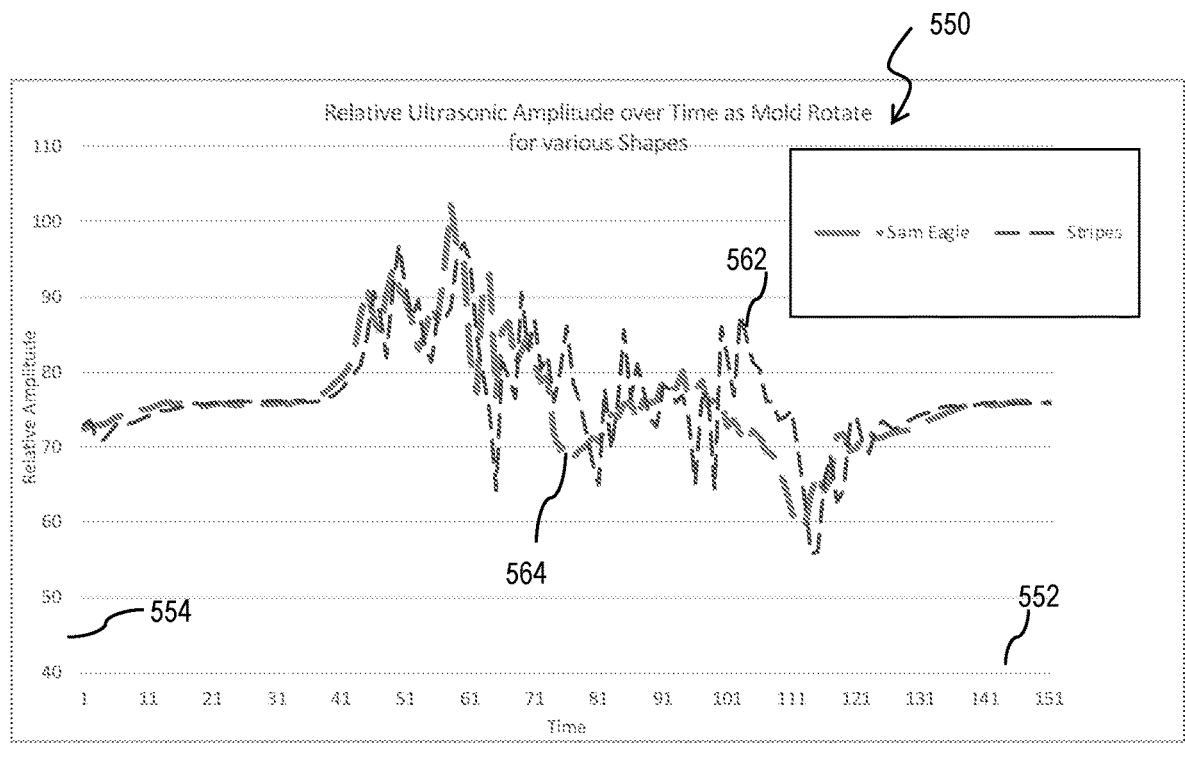
FIG. 7B is a graph that illustrates an example of curves indicating an ultrasonic amplitude of the ultrasonic apparatus for different shaped altered areas, according to various embodiments.

FIG. 7A is a graph 500 that illustrates an example of curves indicating an ultrasonic amplitude of the ultrasonic apparatus for different shaped altered areas, according to various embodiments. FIG. 7B is a graph 550 that illustrates an example of curves indicating an ultrasonic amplitude of the ultrasonic apparatus for different shaped altered areas, according to various embodiments. In an embodiment, FIGS. 7A and 7B compare the ultrasonic amplitude response over time for different shaped altered areas. "Rectangle" indicates a purely rectangular altered area shape with sharp corners. "Airpod" is a rounded shaped altered area such as FIG. 3A, generally oval, with a large lateral protrusion arm 239 in the CD 244. "Sam Eagle" is a generally rectangular shaped altered area with a CD lateral protrusion. "Striped" is a segmented embodiment of the "Sam Eagle" shaped altered area, with unbonded regions. Horizontal axes 502, 552 in FIGS. 7A and 7B is time in units of seconds. Vertical axes 504, 554 in FIGS. 7A and 7B is relative amplitude (unitless).

The curve 510 in FIG. 7A for the rectangular shaped altered area shows a large spike at the leading edge for over ten milliseconds. This high spike over a long duration is associated with leading edge burn thru and holes, as well as thin membrane regions intermediate the formed hooks. The central region of the rectangular altered area shows significant reduction in ultrasonic amplitude. This relatively low amplitude may be associated with poor hook formation. A result may be good hook formation at a leading edge, albeit with burn thru, and poor hook formation in a central region. The low amplitude on the trailing edge is associated with an over-reaction of the control system after the altered area rotates out of operative contact with the sonotrode 202. The oscillatory response observed may be indicative of a marginally stable amplitude control loop. Instabilities of this loop may be associated with generator faults and machine stops. In comparison, curve 512 indicates that the airpod amplitude time response is relatively well behaved. The initial spike is slightly higher, due to the wide arm rotating in near the leading edge in this example. While the results are similar, these results are despite the wider in-nip width. The rounded leading edge results in a shorter duration exceeding 95% rated amplitude versus the rectangular altered area. At the trailing edge, the rounded shape results in somewhat less ringing, and a 10% reduction in the amplitude excursion from target as the altered area rotates out of operative contact with the sonotrode 202. Thus, the ultrasonic control system can maintain sufficiently close to target amplitude with a sufficiently balanced pattern, even when some portions of the shaped altered area are wider than a simple pattern.

The curves 562 and 564 of FIG. 7B for the respective striped and Sam Eagle shaped altered areas demonstrate the problems with unbalanced patterns and sharp corners. The curve 564 for the Sam Eagle shaped altered area spikes over 100% amplitude at the CD protrusion region, yet the amplitude falls to 70% in the middle of the altered area. Such wide amplitude swings may exceed the operating process window, resulting in poorly or unformed hooks in the low amplitude regions and burn thru in the high amplitude regions. The striped altered area indicated by curve 562 is worse, with significant time variation in the amplitude, of less than 65% up to 95%. The large variations in the striped pattern force and amplitude response make sure patterns difficult to tune and adjust from a control system perspective. The pattern balance in general is a method to achieve a more constant process particularly for the amplitude and force variable illustrated as examples in FIGS. 7A and 7B. Managing the mechanical system to mitigate disturbance inputs to the multiple control loops may provide higher quality, fewer defects, fewer lines tops, and enable higher line rates.

While shaped and intermittent altered areas (e.g. unitary fastener patches) are briefly disclosed in conventional methods, the importance of pattern balance of these altered areas is not broadly understood in conventional methods. Ultrasonic bonding is often considered capable of processing a wide variety of shaped patterns, without adverse effects. Rotary formation of unitary fasteners is quite different. The percentage of the substrate 211 which is in contact with the second device 202 (e.g. rotary sonotrode) is commonly above 50%, 75%, 80%, 90%, and even 95% of the substrate area. In contrast, typical non-woven or film bond patterns in the disposable absorbent articles industry may be less than 10%, less than 5%, and less than 2.5% of the web width. Rotary formation of unitary fasteners may utilize much higher compression forces from the second device 202 (e.g. sonotrode) to the first device 201 (e.g. anvil). For example, forces of 1 kN, 2 kN, 3 kN, or even 5 kN may be required for unitary rotary formation of protrusions 209 in a non-woven web. In contrast, 800N or 1000N are considered relatively high force levels for NW-NW lamination. As the force is higher, the power draw consumed from the second device 202 (e.g. sonotrode) is much higher. Thus, the control loops for the ultrasonics may be more susceptible to disturbances in rotary formation of protrusions 209 than in prior art bonding applications.

The adjustment of the shape of the altered area 232 to achieve pattern balance using the embodiments of the present invention discussed herein advantageously reduces disturbances, especially force disturbances, and may become important to successful protrusion formation. Conventional methods disclose intermittent altered areas, rounded edges, and a variety of altered area shapes. These conventional methods do not disclose the techniques required to successfully convert such materials. Pattern balance of the altered area that reduces the disturbances from the substrate to the second device 202 (e.g. sonotrode), may form one key method. For example, it is known in conventional methods to avoid sharp corners, substantially CD aligned leading and trailing edges, compound curves, and other shapes which may lead to high transient loadings. Reductions in the process parameters of force, amplitude, frequency, and power draw of the ultrasonic system may be achieved by selection of an appropriate altered area shape. As used herein, ultrasonic force may refer to an applied force or may be applied to a reaction force, where the reaction force is an induced load generated by compressing a thickness of substrate intermediate the second device 202 (e.g. sonotrode) and the first device 201 (e.g. a mold roll) with a certain gap. While commercial ultrasonic systems may run in force or position mode, it is recognized that the force control mode may be achieved via a slow bandwidth outer loop position controller generating a setpoint based on a feedback signal from a force transducer. On the time scale of a single intermittent patch, the sonotrode to anvil gap may be essentially constant.

FIGS. 3A and 3B disclosed herein demonstrate improved pattern balance via positioning of a negative space (e.g. island area 252). In an example embodiment, the island area 252, or a region of the substrate 211 which is not operatively engaged by the second device 202 (e.g. source of ultrasonic energy 205) is disposed proximate a wider CD region of the altered are 232' (e.g. near the nip area 247b' in FIG. 3A). Although conventional methods disclose forming regions not engaged by the second device 202, they do not disclose the relative disposition of such regions to distal protrusions and other elements of the altered area such that pattern balance is optimized. In the embodiment of FIG. 3B, the practical effect of the placement of the island area 252 is to improve the pattern balance of the altered area 232" (relative to the altered area 232' without said island area 252). Placing the island area 252 adjacent to proximate regions of relatively increased CD altered area width, advantageously reduces the peak reaction force experienced by the second device 202 (e.g. sonotrode). In the absence of the pattern balance disclosed herein that is achieved for the altered areas, various drawbacks may arise in the operation of the apparatus 200, 200' which will now be listed herein. For example, high peak forces may exceed the capacity of the second device 202 (e.g. sonotrode). Additionally, these force disturbances may lead to dynamic performance errors in the amplitude, frequency, and/or power control loops of the apparatus 200, 200'. Furthermore, the force disturbances may induce mechanical resonance modes of the second device 202 (e.g. sonotrode) or the first device 201 (e.g. anvil) at critical frequencies. Furthermore, the force disturbances may induce position corrections of a sonotrode positioning loop, which may overreact to disturbances. Additionally, disturbances in any of the control loops of the apparatus 200, 200', especially force and amplitude, may result in burn-thru of the thin polymer membrane by the apparatus 200, 200'. Disturbances in any of the control loops of the apparatus 200, 200', especially the second device 202 (e.g. sonotrode) position, force and amplitude, may result tearing of the thin polymer membrane by the apparatus 200, 200', in the absence of pattern balance of the altered area(s) in the substrate.

The altered area may achieve pattern balance, meaning the size of the substrate region in operative engagement intermediate the second device 202 (e.g. sonotrode) and the first device 201 (e.g. mold roll) at any position of the process may be held within a range. Ultrasonics may be more robust than other bonding technologies, such as crimping. Pre-heat of substrates may enable a large operating range for rotary formation. For example, a threshold range for the CD width 262 of the integral areas 235 may be between about 20 mm to about 45 mm to enable a process resulting in consistent protrusion 209 formation throughout an altered area. Maintaining a pattern balance ratio of maximum CD width 262 to minimum CD width 262 in the altered area may enable robust protrusion formation. In some embodiments, leading and trailing edge regions may be excluded from the pattern balance. In an example embodiment, the pattern balance may be 100%, greater than 90%, greater than 50%, or greater than 30%. The threshold range for the CD width 262 of the altered area 232 may be increased by the shape. Altered areas in conventional methods were as narrow as 20 mm. Altered areas may contain island areas, or regions where no protrusions and/or no membrane are formed.

These island areas may comprise discrete insignia, such as a heart shape. The MD location of the island area may be chosen to reduce the pattern imbalance. For example, a 6 mm wide island area may be used adjacent a CD protrusion from an altered area to reduce the effective CD width 262 of a 36 mm altered area to that of a 30 mm altered area. The island areas utilized for pattern balance may comprise MD, CD, or inclined lines or patterns. Altered areas may be larger and may contain more protrusions, which may better control rotation of the ear to improve fit in use. A portion of the altered area may protrude towards a distal region of the product, and may cross a fold line, which may be a e-folded edge of a diaper. The protrusions may then mitigate slippage of adjacent diapers in a stack or bag relative to each other, which may help retain a desirable primary package shape.

area is +/−20 mm$^2$ per mm of mold roll rotation for rectangular substrates, and less than about 8 mm$^2$ per mm of mold roll rotation for example inventive shapes. The rate of change may be evaluated at the leading and trailing edges. For example, the rate of change for an approximate 10 mm radius is about +/−38% at the leading and trailing edges (arm is on the trailing edge in these examples, so the bottom is the leading edge). In some embodiments, a distal protrusion from a central region of the substrate is desirable. For example, the long thin arm in the above example. Such distal regions may significantly upset the pattern balance, and may lead to large regions of poorly formed hooks. In some instances, an island of non-woven is placed within the unitary formed fastener region. For example, the island region may comprise a graphic or insignia, such as a heart.

TABLE 1

| Section Line | Width [mm] | Height [mm] | Simple Area | Running Average | B2T Area Change | B2T Area change [%] | | |
|---|---|---|---|---|---|---|---|---|
| 0 | 8 | 1 | 8 | — | −5.5 | −41% | 36.0 | Max |
| 1 | 13.5 | 1 | 13.5 | — | −5.7 | −30% | 18.9 | Min |
| 2 | 19.2 | 1 | 19.2 | — | −4.2 | −18% | 1.9 | Ratio |
| 3 | 23.4 | 1 | 23.4 | — | 0.3 | 1% | | |
| 4 | 23.1 | 1 | 23.1 | — | −3.7 | −14% | | |
| 5 | 24 | 1 | 26.8 | 21.2 | −2.9 | −10% | | |
| 6 | 22.7 | 1 | 29.7 | 24.4 | −4.6 | −13% | | |
| 7 | 23.3 | 1 | 34.3 | 27.5 | −1.5 | −4% | | |
| 8 | 24.9 | 1 | 35.8 | 29.9 | −0.6 | −2% | | |
| 9 | 26.1 | 1 | 36.4 | 32.6 | −0.1 | 0% | | |
| 10 | 27.2 | 1 | 36.5 | 34.5 | 0.3 | 1% | | |
| 11 | 28.2 | 1 | 36.2 | 35.8 | 1 | 3% | | |
| 12 | 29 | 1 | 35.2 | 36.0 | 7.7 | 28% | | |
| 13 | 23.4 | 1 | 27.5 | 34.4 | 2.1 | 8% | | |
| 14 | 24.5 | 1 | 25.4 | 32.2 | 1.4 | 6% | | |
| 15 | 24 | 1 | 24 | 29.7 | 1.1 | 5% | | |
| 16 | 22.9 | 1 | 22.9 | 27.0 | 0.9 | 4% | | |
| 17 | 22 | 1 | 22 | 24.4 | 0.6 | 3% | | |
| 18 | 21.4 | 1 | 21.4 | 23.1 | 0.6 | 3% | | |
| 19 | 20.8 | 1 | 20.8 | 22.2 | 0.4 | 2% | | |
| 20 | 20.4 | 1 | 20.4 | 21.5 | 0.4 | 2% | | |
| 21 | 20 | 1 | 20 | 20.9 | 0.4 | 2% | | |
| 22 | 19.6 | 1 | 19.6 | 20.4 | 0.5 | 3% | | |
| 23 | 19.1 | 1 | 19.1 | 20.0 | 0.8 | 4% | | |
| 24 | 18.3 | 1 | 18.3 | 19.5 | 1 | 6% | | |
| 25 | 17.3 | 1 | 17.3 | 18.9 | 1.3 | 8% | | |
| 26 | 16 | 1 | 16 | — | 1.7 | 12% | | |
| 27 | 14.3 | 1 | 14.3 | — | 2.3 | 19% | | |
| 28 | 12 | 1 | 12 | — | 3.3 | 38% | | |
| 29 | 8.7 | 1 | 8.7 | — | 0.7 | 9% | | |
| 30 | 8 | 1 | 8 | — | 0 | 0% | | |

In an embodiment, Table 1 above provides data pertaining to the parameter values for assessing pattern balance with respect to the altered area 232' of FIG. 3A. In an embodiment, a series of integral areas were drawn with MD spacing 266 of 1 mm. The CD width 262 of the integral area(s) at every 1 mm increment was multiplied by the MD length 264 to determine a simple area. The running average in Table is the average area of a plurality of integral areas within the nip (e.g. 5 integral areas). The MD length 243 of the in-nip substrate was measured using a nip impression mold. The running average or average area is based on the number of integral areas in-nip MD length 243. The minimum and maximum threshold values for the average area or running average were used to define pattern balance. The pattern balance may also be evaluated based on the rate of change of the average area ("B2T area change" in Table 1) for a given MD slice dimension, which may or may not use a running average. For example, the rate of change for 1 mm integral areas is in a range from −38% to +39% in the example above. Alternately, the rate of change of the average The island area may be used to affect an improved pattern balance via any of the methods disclosed here or via other methods of evaluating pattern balance. Note that the values shown in Table 1 are merely one example embodiment of different values for the different parameters used to assess pattern balance and thus these parameter values are not limited to the specific values provided in Table 1.

In an example embodiment, FIG. 6A provides a complementary study, looking at the average area being altered in the nip area for four altered area shapes: a rectangular substrate, an oval with protruding CD arm (aka "Gru), an airpod, and an airpod with an island area (e.g. unformed heart shaped island feature). The curve 414 for the rectangular shaped altered area demonstrates a linear ramp with a high first derivative and infinite second derivative of area with respect to MD position in the altered area. MD position in the altered area may be considered a time domain for the purposes of this study. The curve 416 for the active area of FIG. 4A has an improved S-curve at leading and trailing edges due to the rounded shape, as do both of the altered area shapes of FIGS. 3A and 3B. The first and second derivatives of all three curves 410, 412, 416 are thus non-infinite second derivative values and the second derivative is limited to a smaller magnitude, creating and easier to follow process for the various control loops of the apparatus 200, 200'. The altered area 232' of FIG. 3A (curve 410) is worse for pattern balance due to the increased CD width 262, with a higher peak in-nip area (e.g. for the nip area 247b' depicted in FIG. 3A). The altered area 232" of FIG. 3B (curve 412) mitigates this effect, reducing the peak in-nip area from over 35 mm² to about 30 mm². The full area under the curve for in-nip area is also reduced, thereby reducing the energy required from the source of ultrasonic energy 205 of the apparatus 200, 200'.

In an example embodiment, FIG. 6B shows a first derivative of FIG. 6A with respect to machine position, which again is analogous to a time domain. The rectangular altered area represented by curve 466 has a clearly higher peak in-nip area rate of change (e.g., 20 mm²_nip_area/mm_MD_position). In comparison, the rounded leading edge of the altered areas of FIGS. 3A, 3B and 4A reduces the leading edge rate of area change to under 10 mm²/mm and under 5 mm²/mm at the trailing edge for the three altered areas of FIGS. 3A, 3B and 4A. The rate of change of the three altered areas of FIGS. 3A, 3B and 4A is held under 8 mm²/mm at the CD protrusion of each pattern. The island area 252 makes a small improvement to the rate of change of in-nip area, from about 8 to about 6 mm²/mm for the altered area 232' without the island area 252 and the altered area 232" with the island area 252.

In some embodiments, rather than only forming protrusions 209 in the active area of the substrate 211, in a first step a continuous patch or a plurality of first discrete patches of protrusions 209 are made in the substrate 211 via the process of positioning the substrate intermediate the second device 202 (e.g. a sonotrode) and the first device 201 (e.g. a mold roll). In a second step, a subset of the continuous protrusion patch formed may then be converted back into a substrate region without protrusions 209 by crushing, flattening, compression, heating, melting, shearing, shaving, burning, ultrasonic energy, a combination of said means, or other means. The resulting protrusion patch may thus have a virtually unconstrained shape. The continuous formation of a plurality of protrusions may enable higher line rates, more consistent protrusion formation, eliminate leading and trailing edge effects, more consistent hook extraction from a mold roll, or provide other process benefits. Certain intermittent patterns may provide similar benefits, which may include pattern balance, short MD gaps in the pattern, low rates of change in process variables which may include ultrasonic amplitude, ultrasonic compression force, ultrasonic shear force, ultrasonic frequency, ultrasonic power, or other process variables. The second step may comprise a compression roller with a suitable patch shape against an anvil roll, either of which may be heated. The second step may comprise a blade or rotary sonotrode against an anvil. The second step may comprise heating or stamping in a cyclic operation, which may utilize a rotating or reciprocating tool. The heating may comprise a heated roll, convective heat transfer from a first side, convective heat transfer from a second side, radiative heat transfer, or a plurality of methods.

The crushed regions may be returned to a film or membrane. The crushed protrusions may be formed into a smooth surface or provided with a surface finish. The surface finish may comprise a pattern, a leatherlike appearance, assets of ridges, or other three dimensional effects. The region may form a cross network of raised protrusions, such as a cross-hatch diamond shape, which may reinforce and/or highlight said hook patch. The crushing process may be by a pressure bond, a heated roller, an ultrasonic sonotrode, a combination of said means, or an alternate method. Such post-processing may be after stripping the substrate with formed protrusions from a mold roll. The post-processing may use the stripper roll as a patterned or mating roll for a shaped pattern.

EXAMPLE

1. A method of altering a portion of a substrate comprising:
   providing a first device comprising an outer surface;
   providing a second device comprising a source of vibration energy;
   forming a nip between the source of vibration energy and the outer surface;
   conveying the substrate through the nip; and
   intermittently altering the portion of the substrate in the nip to create a pattern of altered areas forming a shape, wherein the altered areas have a pattern balance, and wherein the pattern balance comprises a width of integral areas within the altered area in a cross machine direction not exceeding a maximum width threshold value across the portion of the substrate.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A method of altering a portion of a substrate comprising:
   providing a first device comprising an outer surface;
   providing a second device comprising a source of vibration energy;
   forming a nip between the source of vibration energy and the outer surface;
   conveying the substrate through the nip; and
   intermittently altering a portion of the substrate in the nip to create a pattern of altered areas forming a shape, wherein the altered areas have a pattern balance, and
wherein the pattern balance comprises at least one of:
an average area of the substrate, altered in the nip being
within a threshold range across the portion of the
substrate, wherein the threshold range of the average
area of the substrate, altered in the nip comprises:
a threshold range maximum; and
a threshold range minimum, wherein a ratio between
the threshold range maximum and the threshold
range minimum is between about 2:1 and about
4:1; and
a simple area of integral areas within the altered areas
being within a threshold range across the portion of
the substrate, wherein the threshold range of the
simple area of integral areas within the altered areas
is between about 10 mm² and about 40 mm².

2. The method of claim 1, wherein the shape comprises a
non-symmetrical shape with respect to one of a cross-
machine direction or a machine direction.

3. The method of claim 1, wherein the pattern balance
further comprises at least one of:
a rate of change of the average area of the substrate,
altered in the nip being less than a threshold value
across the portion of the substrate; and
a rate of change of the simple area of integral areas within
the altered area being less than a threshold value across
the portion of the substrate.

4. The method of claim 1, wherein the altered areas are
registered on the substrate, in a machine direction and a
cross-machine direction.

5. The method of claim 1, comprising cooling the source
of vibrational energy or the first device.

6. The method of claim 1, wherein the second device is a
rotary sonotrode, and wherein the vibration energy is ultra-
sonic energy.

7. The method of claim 1, wherein the second device is a
blade sonotrode, and wherein the vibration energy is ultra-
sonic energy.

8. The method of claim 1, comprising providing a plu-
rality of recesses in the outer surface of the first device,
wherein the recesses have a shape configured to produce
projections in the altered areas suitable for use in a touch
fastener.

9. The method of claim 1, wherein the substrate, com-
prises more than one layer or more than one material.

10. The method of claim 1, comprising imparting thermal
energy to the portion of the substrate, upstream of the nip to
heat the portion of the substrate, to a temperature below a
melting temperature of the portion of the substrate.

11. The method of claim 1, wherein the altered areas have
a cross-machine directional width in the range of about 20
mm to about 45 mm.

12. The method of claim 1, wherein the altered areas
comprise unaltered portions to contribute to the pattern
balance.

13. The method of claim 1, wherein the altered areas
comprise hooks for a touch fastener.

14. A method of altering a portion of a substrate, com-
prising:
providing a first device comprising an outer surface;
providing a second device comprising a source of vibra-
tion energy;

26 forming a nip between the source of vibration energy and
the outer surface;
conveying the substrate, through the nip; and
intermittently altering a portion of the substrate, in the nip
to create a pattern of altered areas forming a shape,
wherein the altered areas have a pattern balance, and
wherein the pattern balance comprises at least one of:
a rate of change of an average area of the substrate,
altered in the nip being less than a threshold value
across the portion of the substrate, wherein the
threshold value of the rate of change of an average
area of the substrate:
is the difference between an average area between a
first nip area and a second nip area, divided by the
average area at the first nip area and multiplied by
100; and
is between about −50% and about 50%; and
a rate of change of a simple area of integral areas within
the altered area being less than a threshold value
across the portion of the substrate, wherein the
threshold value of the rate of change of a simple area
of integral areas is between about −20 mm² and
about 20 mm².

15. The method of claim 14, wherein the shape comprises
a non-symmetrical shape with respect to one of a cross-
machine direction or a machine direction.

16. The method of claim 14, wherein the pattern balance
further comprises at least one of:
the average area of the substrate, altered in the nip being
within a threshold range across the portion of the
substrate; and
the simple area of integral areas within the altered area
being within a threshold range across the portion of the
substrate.

17. The method of claim 16, wherein the altered areas
comprise unaltered portions to contribute to the pattern
balance.

18. The method of claim 14, comprising imparting ther-
mal energy to the portion of the substrate, upstream of the
nip to heat the portion of the substrate, to a temperature
below a melting temperature of the portion of the substrate.

19. A method of creating protrusions in a portion of a
substrate, comprising:
providing a first device comprising an outer surface;
providing a second device comprising a source of vibra-
tion energy;
forming a nip between the source of vibration energy and
the outer surface;
conveying the substrate, through the nip;
continuously creating the protrusions in a portion of the
substrate in the nip to create a continuous area of the
protrusions; and
flattening a portion of the continuous area of the protru-
sions to create intermittent areas of the protrusions in
the substrate intermediate flattened portions.

20. The method of claim 19, comprising imparting ther-
mal energy to the portion of the substrate upstream of the nip
to heat the portion of the substrate to a temperature below a
melting temperature of the portion of the substrate.

* * * * *